United States Patent [19]

Shaughnessy

[11] Patent Number: 5,692,178
[45] Date of Patent: Nov. 25, 1997

[54] SYSTEM AND METHODS FOR IMPROVED FILE MANAGEMENT IN A MULTI-USER ENVIRONMENT

[75] Inventor: Steven T. Shaughnessy, Scotts Valley, Calif.

[73] Assignee: Borland International, Inc., Scotts Valley, Calif.

[21] Appl. No.: 682,055

[22] Filed: Jul. 16, 1996

Related U.S. Application Data

[62] Division of Ser. No. 933,480, Aug. 20, 1992, Pat. No. 5,555,388.

[51] Int. Cl.[6] ........................................ G06F 12/00
[52] U.S. Cl. ..................... 395/608; 395/477; 395/414
[58] Field of Search ............................ 395/608, 477, 395/414

[56] References Cited

U.S. PATENT DOCUMENTS

| | | | |
|---|---|---|---|
| 5,043,876 | 8/1991 | Terry | 395/617 |
| 5,063,501 | 11/1991 | Jordan, Jr. | 395/726 |
| 5,072,378 | 12/1991 | Mauka | 395/182.04 |
| 5,119,291 | 6/1992 | Flannagan et al. | 395/404 |
| 5,247,660 | 9/1993 | Ashcraft et al. | 395/600 |
| 5,263,165 | 11/1993 | Janis | 395/490 |
| 5,276,867 | 1/1994 | Kenley et al. | 395/600 |
| 5,285,528 | 2/1994 | Hart | 395/726 |
| 5,287,521 | 2/1994 | Nitta et al. | 395/726 |
| 5,319,780 | 6/1994 | Catino et al. | 395/608 |
| 5,327,556 | 7/1994 | Mohan et al. | 395/610 |
| 5,555,388 | 9/1996 | Shaunessy | 395/427 |

Primary Examiner—Thomas G. Black
Assistant Examiner—Hosain T. Alam
Attorney, Agent, or Firm—John A. Smart

[57] ABSTRACT

A computer system having concurrently shared objects or resources is described. An exemplary embodiment includes a multi-user database management system having information tables and related objects stored in shared directories on a file server. A plurality of lock types, including directory lock, full lock, write lock, prevent full lock, and prevent write lock, are provided for controlling concurrent access. Methods are described for managing locks by creating a special lock file for each shared directory that is accessed. The lock file stores at least one logical lock file having locking or concurrency information specific to a family of related members. The logical lock file itself includes a plurality of entries for specifying concurrency information of associated family members. A shared object or resource is accessed according to the information retrieved from the corresponding logical lock file.

24 Claims, 12 Drawing Sheets

| LOCK | EFFECT |
| --- | --- |
| Dir lock | Places a lock on a shared directory, allowing read-only access to the directory's files. |
| Full lock | Places a complete lock on objects, allowing no access by other users. Not compatible with other locks. |
| Write lock | Places a partial lock on objects, allowing read-only access by other users. Compatible with other write locks and prevent full locks. |
| Prevent write lock | Prevents other users from starting operations that require either full or write locks. Compatible with other prevent write locks and prevent full locks. |
| Prevent full lock | Prevents other users from starting operations that require full locks. Compatible with all locks except full locks. |

*FIG. 2A*

MOVE LOGICAL FILE:

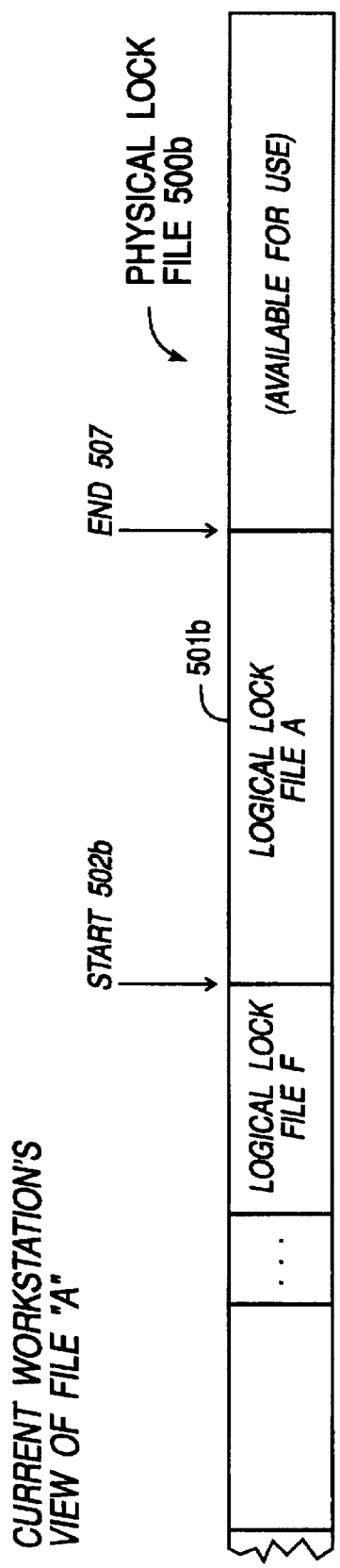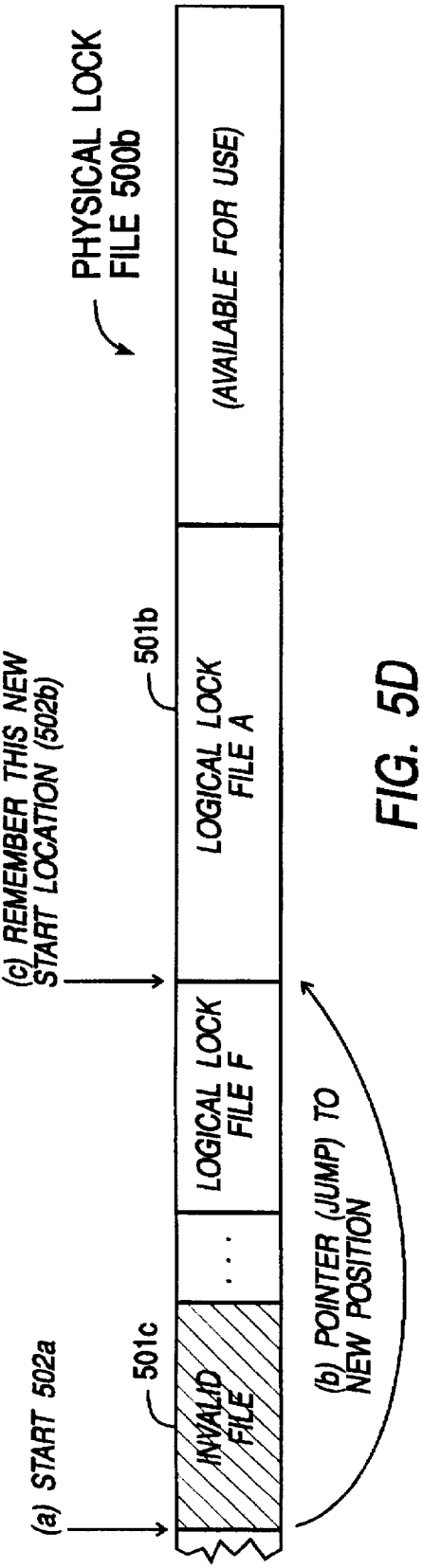

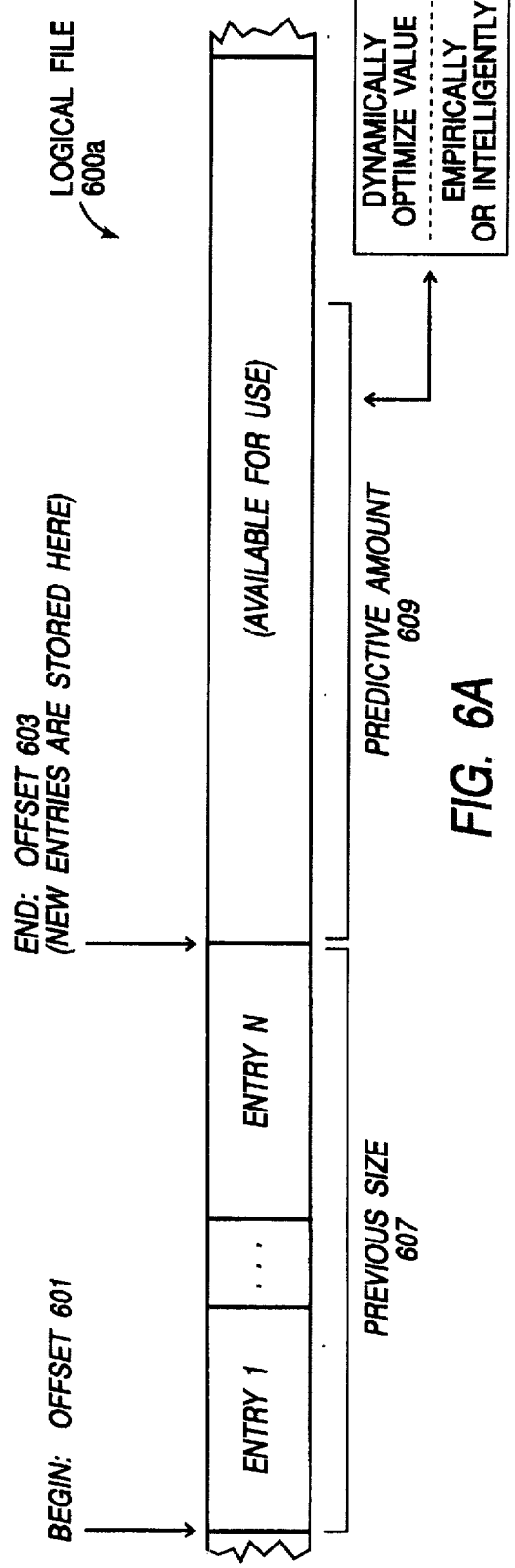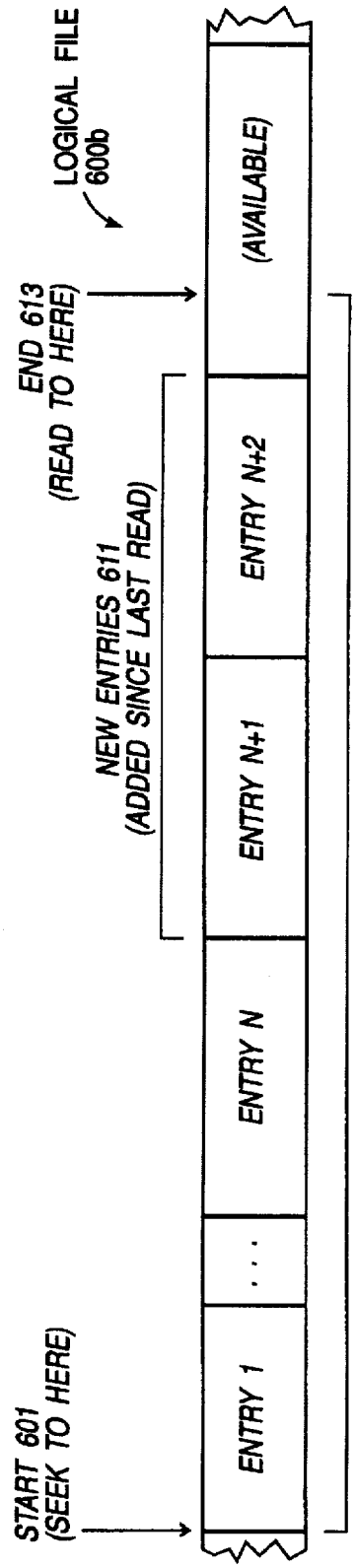

SYSTEM AND METHODS FOR IMPROVED FILE MANAGEMENT IN A MULTI-USER ENVIRONMENT

The present application is a divisional application of application Ser. No. 07/933,480, filed Aug. 20, 1992, now U.S. Pat. No. 5,555,388, issued Sep. 10, 1996.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to data processing environments and, more particularly, to accessing shared resources in a multi-user environment, such as a computer network system.

Computers are a powerful tool for the acquisition and processing of information. Computerized databases, which can be regarded as a kind of electronic filing cabinet or repository for collecting computerized data files, are particularly adept at processing vast amounts of information. As such, these systems serve to maintain information in database files or tables and make that information available on demand.

Between the actual physical database itself (i.e., the data actually stored on a storage device) and the users of the system, a database management system or DBMS is provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without knowledge of underlying system implementation. In this manner, the DBMS provides users with a conceptual view of the database that is removed from the hardware level. The general construction and operation of a database management system is known in the art. See e.g., Date, C., *An Introduction to Database Systems*, Volume I and II, Addison Wesley, 1990; the disclosure of which is hereby incorporated by reference.

Of particular interest to the present invention are those information processing systems which are operative in a shared fashion, i.e., by multiple users at a given time. A multi-user database implemented on a client/server platform is one such system. Typically, information sharing or connectivity between the users is provided by a network, which comprises several computers connected together as a group. At least one of the PCs functions as a "server," providing network services to "clients" (other computers) on the network. In this manner, valuable resources, such as programs, information tables, memory, disk space, printers, and the like, may be shared by several users.

Inherent in any multi-user computing system is a basic conflict between data integrity and concurrency, i.e., the need to let many users access the same data simultaneously. To ensure data integrity, such a system could allow only one user to use a data table at any given time, but this would be highly inconvenient to other users. On the other hand, the system could allow anyone on a network to use any table at any time. Such unrestricted access, however, would quickly lead to inconsistencies in the data. The need for insuring data integrity, therefore, must be balanced with the need to provide maximum concurrent access. Thus, a key issue in designing any multi-user application is deciding how to resolve simultaneous requests for the same resources.

The need for concurrency control is perhaps most acute in a multi-user database system, where information is frequently or even constantly being updated by several users. Suppose, for example, that two users are both executing an application that reads a particular value from a database, performs a calculation on the value, and writes a new value back to the database. If this process begins concurrently, both users will read the same database value, e.g., three. Suppose the calculation is to increment the database value by one. After both users have finished, the new value stored in the database will be four. However, the correct value desired is five, since each of the two intended to add one to the value of three. Thus, the concurrent actions of two processes have interfered, leaving incorrect data in the database.

The technique most commonly employed for coordinating processes and controlling access to shared resources is a "lock" mechanism. Without such a scheme, a second user may update an object, thus providing the first user with old data (as in the above example). With locks, objects (e.g., tables, reports, forms, and other resources) are restricted in such a way that interference problems are avoided. This service is most conveniently managed by the network database system, with typically some low-level locking mechanism provided by the operating system. In this manner, multiple users may transparently access the same resources in the same database at the same time, with data integrity fully maintained.

In its simplest form, locking an object prevents other processes or transactions from accessing that object (or portion thereof) until the lock is released. In general, the less that is locked, the greater the potential for concurrency: more processes can simultaneously access the database without encountering each other's locks. If the lock is too weak, however, data integrity may still be compromised. On the other hand, a lock which is too strong unnecessarily restricts others from accessing the locked object. Thus, providing the right type of lock for a user's need is an important consideration.

Two types of locks are fundamental to concurrency: write locks and read locks. Exclusive or write locks allow the user of the lock full access to the locked object. That user holds sole access to the object for reading and changing. While a write lock is in place, no other user can read or access that object. Moreover, no other user can place a write lock on that object (i.e., it has already been locked by another). A shared or read lock, in contrast, allows multiple users to access an object but only guarantees the current state of the object. The lock guarantees that no other user will be granted write access to the object; others may be granted read access, however. With a read lock, therefore, multiple users can view an object of a database; at the same time, the system prevents any changes to that object.

In addition to the locks themselves, there are also interactions between locks, including some locks blocking other locks. For example, a write lock must block a read lock as well as another write lock. A read lock, on the other hand, blocks attempts to write to the object, but it does not block other read locks. If a requested lock is blocked by another, the requestor must wait until that block is removed. A system may also provide a "time-out," i.e., a pre-set time limit specifying the maximum time one waits for an object to be unlocked. If a request for a lock fails, the system typically will undo or roll back the current transaction, including releasing other locks held by that process.

Regardless of the type or hierarchy of locks provided, a system must be able to process locks in real-time. In particular, many database systems (e.g., relational DBMSs) are designed to manage multiple short transactions, each occurring on the order of fractions of a second. To accommodate these transactions, locks must be capable of being held for only short periods of time. All the while, the database system must somehow keep track of which objects are locked and what interactions are occurring between the locks.

Possible approaches for a system include maintaining a table of objects which are locked, marking objects which are locked, and storing locked objects in a special area of memory. Of particular interest to the present invention is the first approach which employs "lock tables" for tracking who holds a lock and what kind of lock it is. Commonly, prior art techniques for managing lock files employ an inefficient system open call mechanism. To lock a record in a table, for example, many steps are required: 1) open the lock file, 2) read the entire contents of that file, 3) determine if a conflict of locks exists, and, if not, add a record lock to the lock file, 4) write the file out to physical disk, and 5) close the file. As this approach requires numerous disk input/output (I/O) operations, a hefty performance penalty is incurred. Thus, prior art techniques employing lock files in multi-user environments of even modest size must compromise performance.

SUMMARY OF THE INVENTION

The present invention fulfills a need for a multi-user system having the advantages of locking, but without the overhead normally associated with such a mechanism. In particular, the present invention comprises a multi-user computer system, such as a client/server system having a file server connected through a network to one or more clients or work stations. As such, the system includes resources which may be shared among several users concurrently.

In a particular embodiment of the present invention a multi-user database management system is provided. This embodiment includes information tables stored in shared directories on the file server. Associated with each table are other family members, including forms, reports, queries, and the like. A plurality of lock types, including directory lock, full lock, write lock, prevent full lock, and prevent write lock, are included for maximizing concurrent access while minimizing corruption and data loss.

Methods are provided for managing locks by creating a special lock file for each shared directory that is accessed. Specifically, a "physical" lock file for storing various locking and related concurrency information is created in the directory being accessed. In turn, the physical lock file stores at least one logical lock file having locking information specific to a shared table and its related (family) members. The physical lock file includes a header and a directory. The header stores housekeeping information, including a "high-water mark" which points to a point of allocation where new logical lock files may be stored. The directory, in turn, stores entries for referencing each logical lock file at a particular location.

The logical lock file itself includes a plurality of entries for specifying concurrency information of associated family members. A preferred layout for a logical lock file includes a header and lock data area. The header stores housekeeping information. Lock data, on the other hand, stores specific locking information as individual registration entries.

A preferred method for accessing a shared object or resource proceeds as follows. First, a request is received for access to an object in a directory. If a physical lock file does not exist for the directory, then one is created. Next, the method checks whether a logical lock file exists for the family of interest. If none exists, then one is created. If, on the other hand, an existing logical lock file is found, then its information or data entries are retrieved using predictive read methods of the present invention.

If the logical lock file which has been read has been marked as invalid (i.e., because it needed to grow), then the method proceeds to retrieve the newly allocated (larger) version of the file. At this point, locking information in the logical lock file may be processed as desired. In particular, access is granted or denied to the various family members based on the concurrency information read. Moreover, the logical lock file itself may be modified, including adding new registration entries and deleting old ones; in this instance, the new file is written back to the storage disk, with the size written being remembered as the current size. The method loops to selected ones of the above step as required.

By storing the lock information for various resources within a single physical lock file (having a plurality of logical lock files), the present invention minimizing disk I/O (input/output) operations. Moreover, a particular workstation (client) of the system need only maintain a single file handle to the single physical lock file (as opposed to maintaining several system file handles for various physical lock files). The net result is substantially improved performance in a multi-user environment.

BRIEF DESCRIPTION OF THE DRAWINGS

FIG. 2A is a table illustrating the types and functions of locks employed by the present invention.

FIGS. 5A–D are block diagrams illustrating re-allocation of a logical lock file of the present invention.

FIGS. 6A–B are block diagrams illustrating a method of the present invention for predictive reading of files logically stored.

Figure 1A:
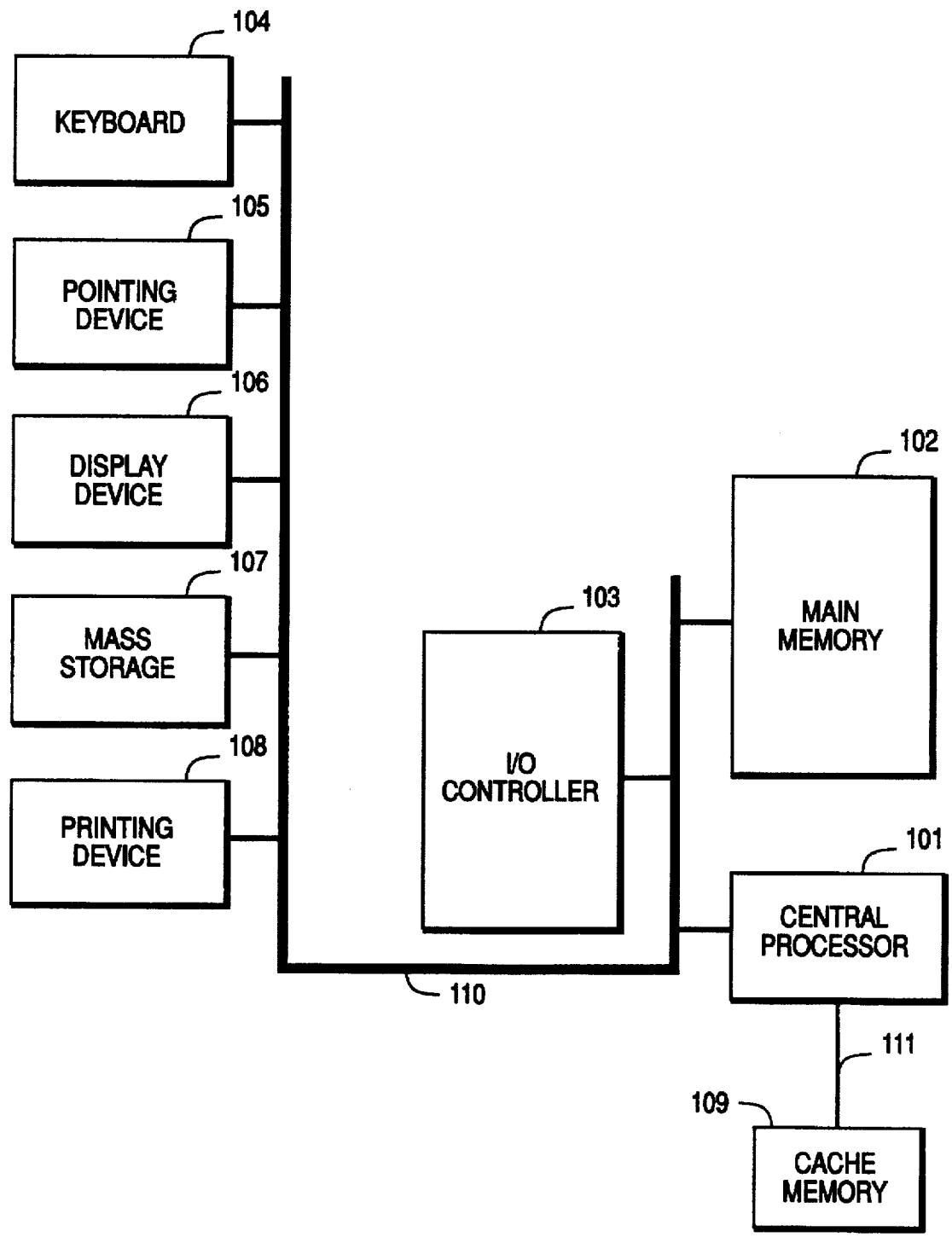
FIG. 1A is a block diagram of a computer system in which the present invention is operative.

GLOSSARY access (disk access): To obtain entry to, or to locate, read into memory, and make ready for some operation. Access is used with regard to disks, files, records, and network entry procedures.

allocate: To reserve memory for use by a program. Programs often need certain system resources such as memory or disk space, and they request them as needed from the operating system.

append: To attach to the end of; this is most often used in reference to writing to a file (adding data to the end of the file).

block (storage block): A group of similar things—usually bytes of storage or data. In disk storage, a block is a collection of consecutive bytes of data that are read from or written to the disk as a group.

cluster: In data storage, a disk-storage unit consisting of a fixed number of sectors (storage segments on a disk) that the operating system uses to read or write information; typically, a cluster consists of two to eight sectors, each of which holds a certain number of bytes (characters).

directory (and subdirectory): A way of organizing and grouping the files on a disk; typically, presented to the user as a catalog for filenames and other directories stored on a disk. What the user views as a directory is supported in the operating system by tables of data, stored on the disk, that contain characteristics associated with each file, as well as the location of the file on the disk.

entry: A unit of information treated as a whole by a program; also refers to the process of inputting information, often in a predetermined form or format, for a computer program to act upon.

field: A member of a row that holds a data value associated with an attribute.

file: A file is a conglomeration of instructions, numbers, words, or images stored as a coherent unit which may be operated upon as a unit (e.g., for retrieving, changing, deleting, saving and the like). A disk file is a basic unit of storage that enables a computer to distinguish one set of information from another; typically includes at least one complete collection of information, such as a program, a set of data used by a program, or the like.

file handle: A "token" (number) that the system uses in referring to an open file. A file handle, like a "CB handle," is a unique identifier.

file name: A file name is a name assigned for identifying a file.

header: Typically the first data in a file, a header stores identity, status, and other data of a file.

index: A stored collection of keys (see below) which facilitate record operations, including searching, inserting, and deleting. Such data structures can include hash tables, binary trees, and B-trees.

input/output: Often abbreviated I/O, input/output refers to the complementary tasks of gathering data for the microprocessor to work with and making the results available to the user through a device such as the display, disk drive, or printer.

key: A data quantity composed of one or more fields from a record. Keys are stored in an index, and each key usually has an attached data pointer that leads to the associated data record.

location (storage location): The position at which a particular item can be found. A storage location can be an addressed (uniquely numbered) location in memory or it can be a uniquely identified location (sector) on disk.

read (disk read): Read is the operation of receiving input into the computer from a peripheral device, such as a disk. A read is an I/O operation: data is being output from the peripheral device and input into the computer.

referencing: Addressing or otherwise targeting a desired object (e.g., file) at a particular (addressable) location.

resource: Any part of a computer system or network, such as a disk drive, printer, or memory, that can be allotted to a program or a process while it is running.

row: Physically, a row is usually a record in a data file. Logically, a row is one horizontal member of a table: a collection of fields.

seek (disk seek): The operation of moving the head in a disk drive to a desired site, typically for a read or write operation.

size: Typically measured in bytes (i.e., 8-bit units), this value reflects the storage required for an object (in memory, on disk, or the like).

storage device: Any apparatus for recording information in permanent or semipermanent form. Most commonly refers to a disk drive.

table: Usually, a collection of rows all stored in one logical file.

write (disk write): To transfer information either to a storage device, such as a disk, or other output device. A disk write transfers information from memory to storage on disk.

DETAILED DESCRIPTION OF A PREFERRED EMBODIMENT

The following description will focus on embodiment of the present invention in a multi-user database environment. The present invention is, however, not limited to any particular exemplary embodiment. Instead, the teachings of the present invention may be advantageously be applied to a variety of architectures. Application of the present invention is particularly advantageous in those architectures having shared resources, including not only multi-user platforms but also multi-tasking ones as well. In the former, there is contention for resources among multiple users; in the latter, contention exists among multiple programs (and/or users). Therefore, the following preferred embodiment and certain alternatives are offered for purposes of illustration and not limitation.

General Architecture

The present invention may be embodied on a computer system such as the system 100 of FIG. 1, which includes a central processor 101, a main memory 102 (e.g., random-access memory or RAM), an input/output controller 103, a keyboard 104, a pointing device 105 (e.g., mouse, track ball, pen device, or the like), a display device 106, and a non-volatile or mass storage 107 (e.g., hard or fixed disk, optical disk, magneto-optical disk, or flash memory). Processor 101 includes or is coupled to a cache memory 109 for storing frequently accessed information; memory 109 may be an on-chip cache or external cache (as shown). System 100 may also be provided with additional input/output devices, such as a printing device 108, as desired. The various components of the system 100 communicate through a system bus 110 or similar architecture, as shown.

Figure 1B:
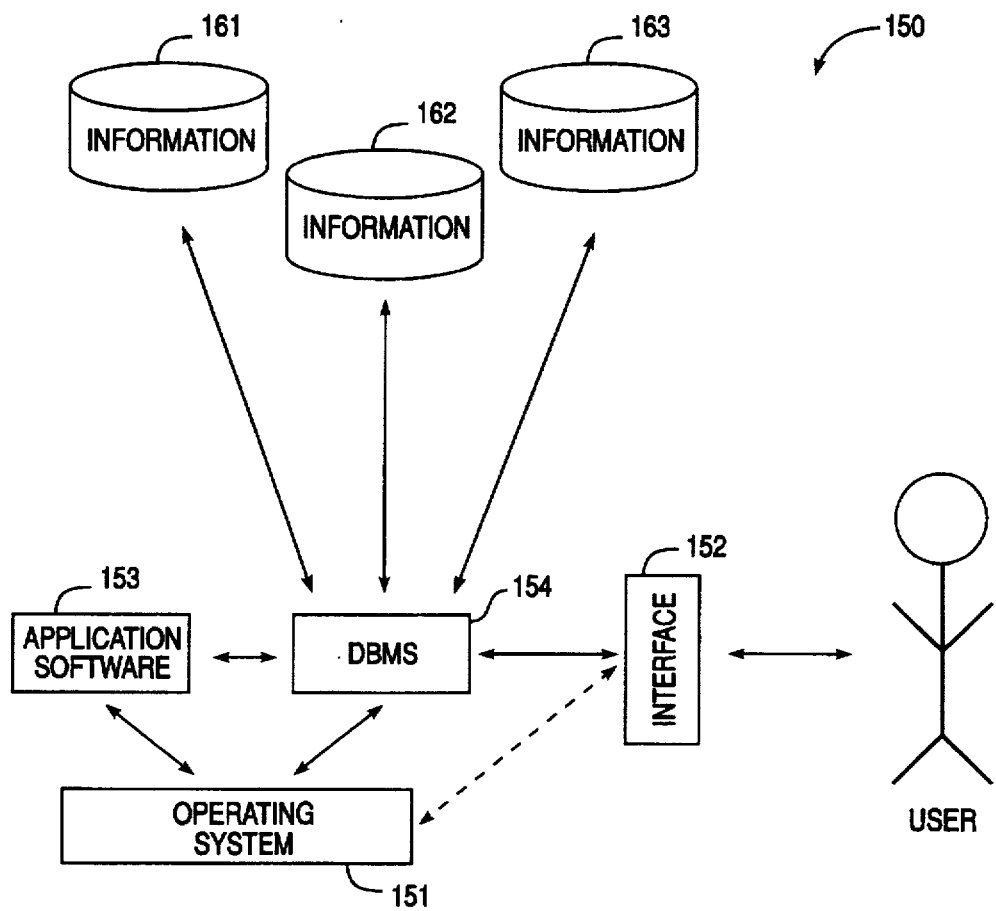
FIG. 1B is a block diagram of a database management system (DBMS) which is operative in the system of FIG. 1A.
Figure 1C:
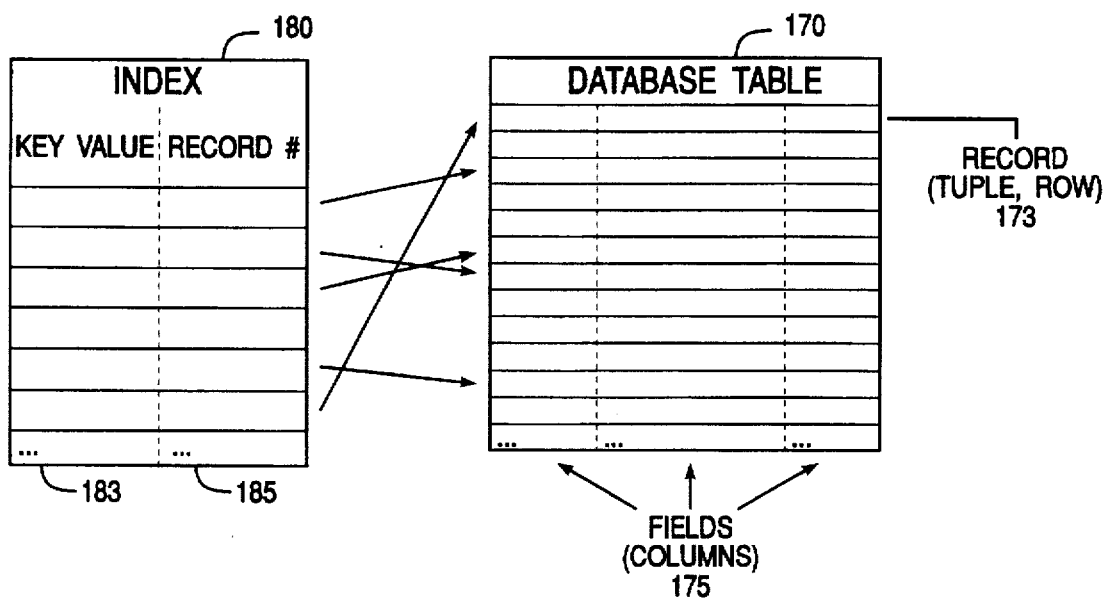
FIG. 1C is a diagram illustrating the storage and management of information in the DBMS of FIG. 1B.

Illustrated in FIG. 1B, a computer software system 150 is provided for programming the operation of the computer system 100. Software system 150, which is stored in system memory 102 and on disk memory 107, includes a kernel or operating system 151 and a DBMS 154. OS 151 is the executive or supervisor for the system 100, directing both task management and data management.

DBMS 154, on the other hand, is a software subsystem for storing, retrieving, and manipulating information in database tables (e.g., tables 161, 162, 163). Under the command of DBMS 154, the system 100 receives user commands and data through user interface 152. Interface 152 includes a built-in query surface or editor for accessing and processing database information. Additional application programs, such as DBMS application software 153, may be "loaded" (i.e., transferred from storage 107 into memory 102) for execution by the system 100, particularly for further controlling the operation of DBMS 154.

In a preferred embodiment, the system 100 is an IBM-compatible personal computer system, available from a variety of vendors (including IBM of Armonk, N.Y.), and operating system 151 is MS-DOS operating system software, available from Microsoft of Redmond, Wash. DBMS 154 is preferably a relational database management system (RDBMS). More preferably, DMBS 154 includes Paradox® Database Management System (available from Borland International of Scotts Valley, Calif.). As interface 152, Paradox provide a worksurface or "canvas" and a command menu; a QBE query worksurface is also provided. Application software 153, in turn, include database command-language applications (e.g., PAL™ scripts), which may be executed or otherwise acted upon by the DBMS 154.

At the outset, it is helpful to understand general techniques for storing information in DBMS 154. In a relational database management system, information is organized into tables, such as table 170 of FIG. 1C. As conceptually shown, table 170 typically includes horizontal rows or records (tuples) 173 and vertical columns or fields 175. A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

By employing one or more database indexes, the records of a table can be organized in many different ways, depending on a particular user's needs. As shown by index 180 of FIG. 1C, for example, an index may be constructed as a single disk file which is referred to internally by the system for locating and displaying records in a database file. Index 180 stores two types of information: index key values 183 and unique record numbers 185. An index key is a data quantity composed of one or more fields from a record; keys are used to arrange (logically) the database file records by some desired order (index expression). Record numbers, on the other hand, are unique pointers to the actual storage location of each record in the database file. In this manner, an index for a database file is similar to the index of a book, which lists subject keys and page numbers that point to where the actual information is located in the book. Specifically, an index organizes (logically not physically) the records in a database file according to the values in one or more fields of interest. As such, an index may greatly speed up searches (queries) for information.

Network Architecture

Figure 1D:
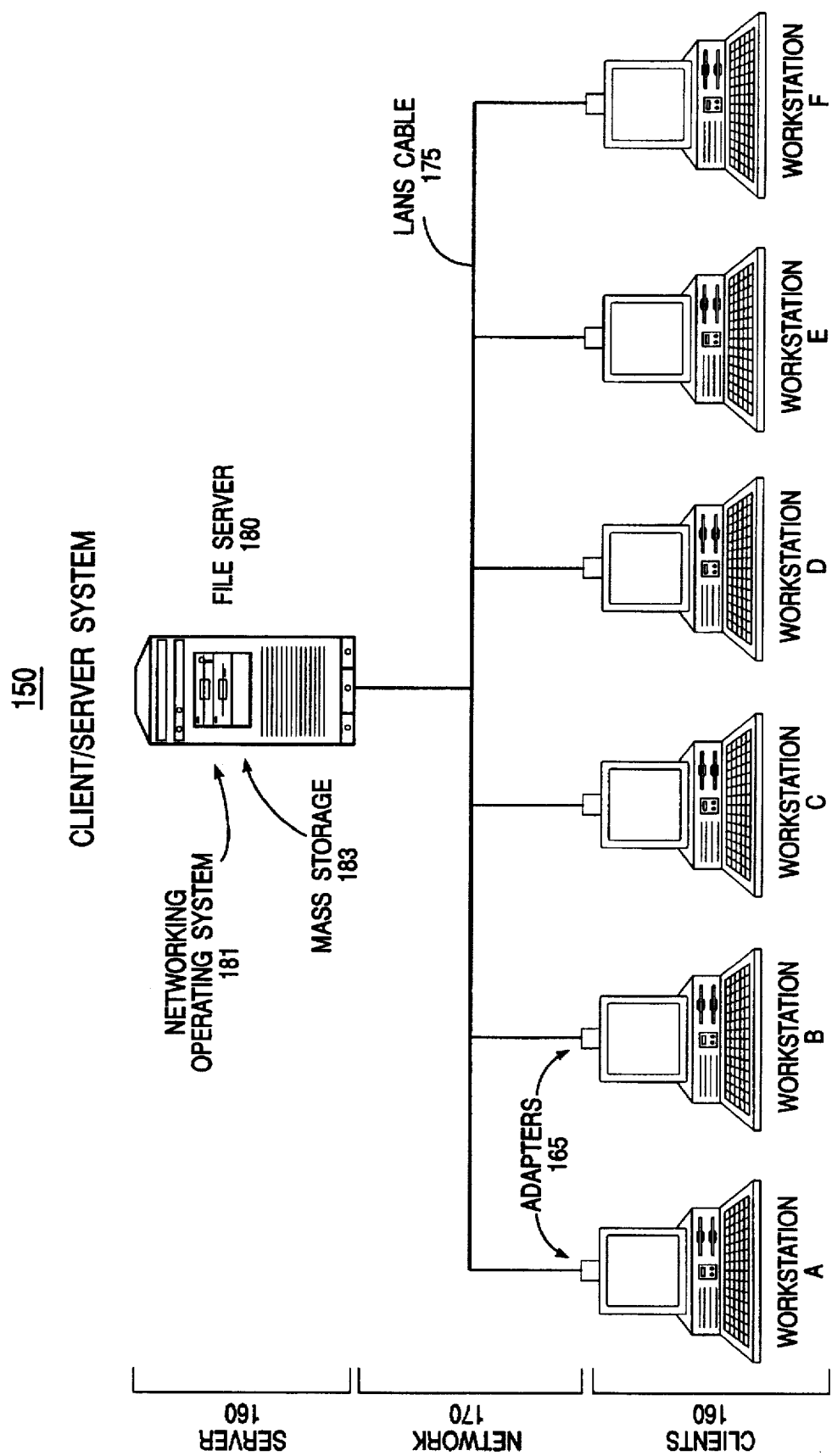
FIG. 1D is a block diagram of a multi-user computing environment, such as a local area network (LAN), in which the present invention may be embodied.

While the present invention is operative within a single (standalone) computer (e.g., system 100 of FIG. 1A), the present invention is preferably embodied in a multi-user computer system, such as the client/server system 150 of FIG. 1D. Specifically, system 150 includes a first computer or file server 180 and one or more second computers or clients 160. In an exemplary embodiment, the clients or workstations 160 are connected to server 180 through a computer network 170, which may be a convention local area network (LAN). Network 170 includes cabling 175 for connecting the server and each workstation to the network. The workstations themselves will be similar to or the same as system 100; additionally, each typically includes an adapter 165 for receiving the network cable 175. Server 180 may also be similar to or the same as system 100. Because the server manages multiple resources for the clients, it should preferably includes a relatively faster processor, larger mass storage, and more system memory than is found on each workstation.

Overall operation of the system 150 is directed by a networking operating system 181, which may be stored in the server's system memory; in a preferred embodiment, OS 181 includes NetWare®, available from Novell of Provo, Utah. In response to requests from the clients 160, the server 181 provides various network resources and services. For instance, multiple users (e.g., workstations A, B, and C) may view a database table stored in file server storage 183, while another user (e.g., workstation E) sends a document to a network printer (not shown). Of particular interest to the present invention is use of system 150 for multi-user database access, which is described next.

Multi-user Database Operation

To an end user, using the DBMS of the present invention in a networking environment is much like using it as a standalone program on a single computer (e.g., system 100). On a network, however, resources may be shared with other users, with two or more users often working with the same resource simultaneously; not unexpectedly, a given network's rules for file-sharing (i.e., trustee assignments of directories and files) come into play. For instance, a user cannot change a table if he or she does not have sufficient network rights to the directory the table resides in. Despite these restrictions, network operations remain, for the most part, transparent to an end user.

According to the present invention, database objects (e.g., tables, forms, reports, and the like) are locked-by system 150 when necessary to ensure data integrity and consistency. Locks temporarily restrict other users from accessing an object while the user (lock holder) is using it. Typically, these sharable objects will be stored in at least one shared directory (e.g., on storage 183).

The system of the present invention provides for both automatic and explicit placement of locks. For example, a special CoEdit mode (fully described in Appendix B) is provided to let two or more users edit a table simultaneously: each record is automatically locked when a user begins to edit it and unlocked when the user leaves the record. Alternatively, each user can use explicit locks (as described in further detail hereinbelow), thus allowing one to maintain complete control over the access of others to tables he or she is sharing.

A. Lock Types

As shown in FIG. 2A, the system of the present invention includes a plurality of lock types. Specific lock types provided include: directory lock, full lock, write lock, prevent full lock, and prevent write lock. In this manner, maximum concurrent access is provided and, at the the same time, corruption and loss of data is avoided. Each lock type will now be described in turn. The reader should note, however, that the terminology employed for locks in the system of the present invention differs in some regards from that traditionally employed.

1. Directory lock

With a directory lock (Dir Lock) in place, all users, including the user who placed the Dir Lock, have read-only access to that directory's files. The user-observable effect is similar to plating a write lock on each table in that directory. While the ability to view tables or other objects is not limited, other locks are preferably blocked. In this manner, a Dir Lock allows a user to guarantee the objects of a particular directory.

A Dir Lock will typically be placed explicitly, with the user who places it having read/write/create access to the corresponding directory. Explicitly-placed Dir Locks should preferably not be removed by the system when the user exits; instead, they should be explicitly removed. Again, only a user with sufficient network rights (e.g., read/write/create access) to a dir-locked directory can remove the Dir Lock.

A Dir Lock may potentially improve system performance when it accesses objects in that directory. Specifically, the directory allows the system to treat any object within that directory as a read-only object. Since no object in a locked directory can be modified, the system does not have to check objects for modifications. Thus, the system can use disk-caching to improve performance when accessing objects in the dir-locked directory.

2. Full lock

According to the present invention, a full lock (exclusive access) is provided as the most restrictive lock that the user or the system can place on an object. Once the user starts an operation that requires the system to apply a full lock to an object, other users cannot access that object for any reason, including viewing, until the lock is released. If the object is a table, a full lock is preferably placed on that table's entire family.

Suppose, for example, that a user is restructuring a Stock table. As soon as the user begins the operation, the system places a full lock on Stock and all of its associated forms, reports, indexes, and other family members. The lock remains in effect until the restructuring is complete. A full lock is desired because if someone else were to gain access to Stock while the user was restructuring it, internal inconsistencies could result. For instance, if another user were viewing the table when the first user deleted a field from its structure, the new structure of Stock would no longer be consistent with the image of the table being viewed by the other user. By employing a full lock, this problem is prevented.

3. Write lock

In contrast to a full lock, a write lock (shared access) only prevents other users from changing the contents of a family of objects. It does not, however, limit user access to the objects in the family, for example, for viewing a database table. A write lock also does not prevent another user from placing a write lock on the object (which prevents the earlier user from writing). In this manner, a write lock allows other users to access an object at the same time the user is doing so, but prevents them from changing that object in any way.

Suppose, for example, a user is copying an Orders table. With a write lock in place, other users can concurrently view the table but cannot change the table's structure or contents until the lock is lifted, such as when the corresponding operation (e.g., restructuring) has finished. If the user tries to start an operation for which a write lock is required, and the object already has a full lock or a prevent write lock on it, or any of the records of the object has a record lock, the user cannot continue. The system applies a write lock to a table when a user who has invoked a user command (e.g., Tools|Net|Changes|Restart) to perform a query or processes a report based on that table. This lock ensures that the query or report is accurate for the period of query or report execution (because no other users can make changes while the write lock is in place).

Like the full lock, the write lock limits the operations other users can perform on the table. Both are appropriate when a table must remain stable for a given period. In the instance where the user intends to perform an operation which cannot tolerate changes to the contents of a table by other users, the user should write lock it. If, on the other hand, the user intends to perform an operation that creates, deletes, sorts, or makes other substantial changes to a table, he or she should probably place a full lock on it. Any number of users can place a write lock on the same table. If more than one write lock has been placed on the table, no users can change the table. If the user wants to guarantee that he or she will have exclusive write access to a table, then the user should place a write lock and a prevent write lock (described below) on the table.

Both full locks and write locks can improve performance. For example, if the user write locks a shared table, many operations are faster because the system does not need to check whether other users have modified it. If the user places a full lock on a shared table, operations are even faster because the system can buffer in memory changes made to the table (rather than having to write each one out as it is made). Thus, write locks and full locks are beneficial even if the user does not expect others to access the table.

4. Prevent write lock

Although it does not actually lock an object, a prevent write lock prevents other users from locking an object, i.e., from placing a write lock or a full lock on an object (explicit locking) or performing an operation that requires placement of either a full lock or a write lock (automatic locking). The lock is perhaps most useful in situations in which modification of a table by two or more users at once is either required or allowed; for example, when multiple users must be able to modify a table simultaneously (CoEdit mode), if any one user places a write lock on a shared table, others cannot make changes to it. If an object the user needs already has either a full lock or a write lock on it, he or she cannot start an operation for which a prevent write lock is required. By securing a prevent write lock, the user guarantees his or her ability to access and make modifications to a table (with the exception that other users can lock individual records, however.)

A prevent write lock on a table prevents the system from being able to apply a write lock to that table to perform a query or process a report. When it encounters a prevent write lock in this situation, the system attempts to process the query or report anyway. If the system detects other users making changes to the table, it restarts the query or report; the user attempting to use that table for a query or a report receives a message each time the system restarts. A command key (e.g., pressing Ctrl-Break) is provided so that the restarts may be aborted.

5. Prevent full lock

A prevent full lock prevents other users from placing a full lock on a table, either automatically or explicitly. Since prevent full locks preclude other users only from obtaining exclusive access to a table, the user guarantees himself or herself at least read-only access to the table.

A prevent full lock does not prevent other users from placing write locks, however. When a user performs an operation that sets a prevent full lock, other users can start any other operation using the same object that does not require a full lock. For example, when a user views a table, the system places a prevent full lock on it. This allows other users to query the table, print reports belonging to the table or involving the table, enter data into the table, and do any other operations that do not require exclusive use of the table. Thus, a prevent full lock is the least restrictive type of lock and, therefore, allows the highest level of concurrent access.

B. Lock interaction and compatibility

The system of the present invention has virtually no limit to the number of locks that it can place simultaneously on an object. Only certain locks can coexist, however. The locks that can coexist for a single object may be summarized by the following table.

|  | Full Lock | Write Lock | Prevent write lock | Prevent full lock |
| --- | --- | --- | --- | --- |
| Full lock |  |  |  |  |
| Write lock |  | ✓ |  | ✓ |
| Prevent write lock |  |  | ✓ | ✓ |
| Prevent full lock |  | ✓ | ✓ | ✓ |

As shown, full locks are incompatible (i.e., cannot co-exist) with all other locks, including record locks. Write locks, on the other hand, are compatible with prevent full locks and other write locks; however, a write lock does not guarantee that the user will be able to change the write-locked table. Prevent write locks are compatible with other prevent write locks and with prevent full locks. Finally, prevent full locks are compatible with all locks except full locks.

Figure 2B:
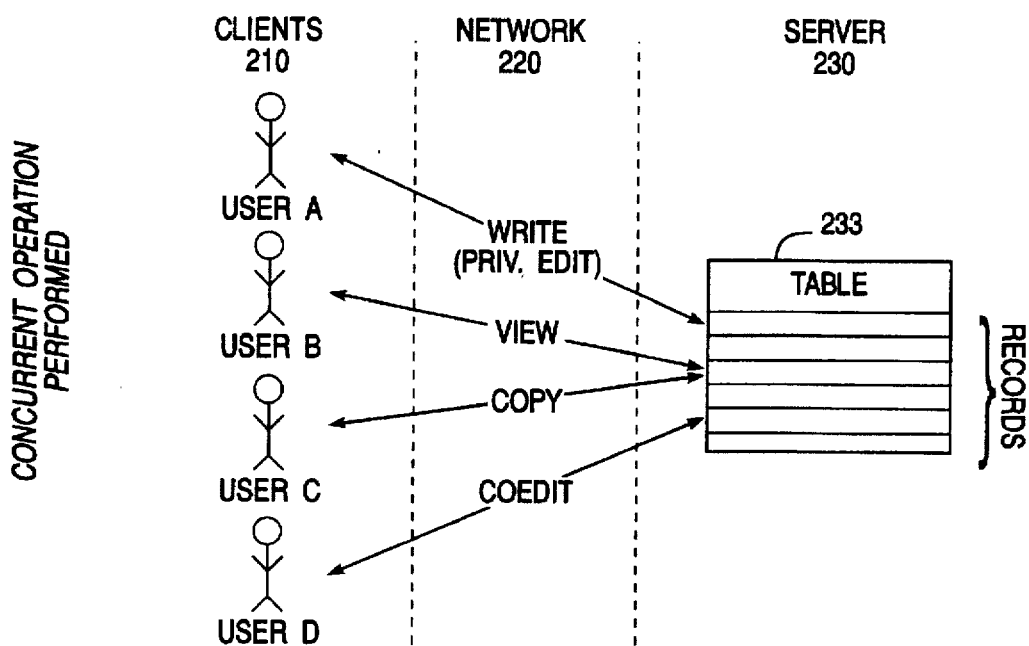
FIG. 2B is a block diagram illustrating different user operations in a shared environment which are performed on the database tables of the system.
Figure 2C:
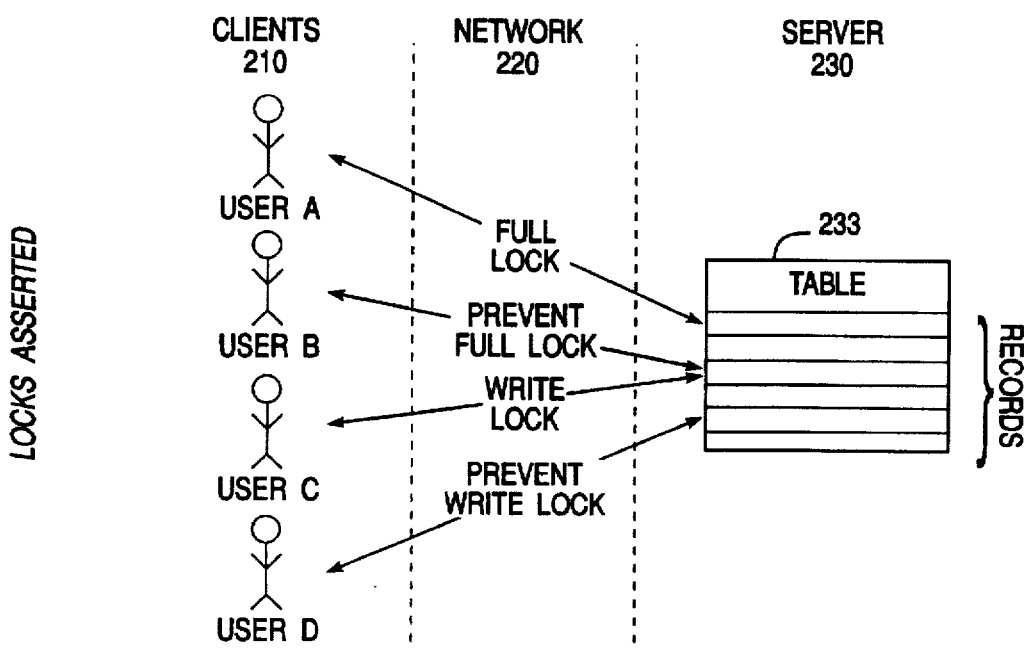
FIG. 2C is a block diagram illustrating the respective locks which are asserted in the shared environment for the operations of FIG. 2A.

Referring now to FIGS. 2B–C, exemplary lock interactions will now be described for concurrent operations in a multi-user environment. As shown, multi-user system 200 includes clients 210 connected to server 230 through network 220. An information table 233, which includes a plurality of information records, is stored in a shared directory of the server 230.

Clients 210 includes Users A–D, each of which desires a certain operation to be performed on the table 233. User A, for example, wishes to perform an exclusive write (private edit) operation on the table 233; this operation requires a full lock to be placed on the table 233, as shown in FIG. 2C. Since a full lock is incompatible with other lock types, no other users (i.e., Users B–D) can have access to the table 233 during this exclusive operation.

Next, User B wishes to perform a view (read) operation on the table 233. This requires that a prevent full lock be placed on the table, as shown in FIG. 2C. The prevent full lock blocks full locks and, thus, would block an exclusive write operation (e.g., by User A). A prevent full lock does not, however, block other lock types; thus, other operations (such as those of User C and D below) may continue to be performed concurrently.

User C desires a copy operation, such as copying the source table 233 into a target table (not shown). For the operation to be successful, the contents of the source table must not change during the operation. With a write lock in place, as shown in FIG. 2C, this requirement is met. Specifically, other users are given read-only access to the table and, thus, cannot change the contents of the table. As the lock is incompatible with both full locks and other write locks, the lock would block the operations of User A (write operation) and User D (CoEdit operation, described next).

User D wishes to perform a "CoEdit" operation, i.e., editing or writing to the table 233 but only one record at a time. As shown, a prevent write lock is placed, thus preventing other users from starting operations which require either full or write locks. Hence, the lock would block the operations of User A and User C.

C. Automatic and explicit locks

Locks can be placed either explicitly by the user or automatically by the system. The former is accomplished by issuing one of a number of lock commands; the latter is invoked in response to a particular operation. Each of these will now be described in further detail.

1. Automatic locks

In a multi-user environment, the system of the present invention automatically locks objects during every operation where there could be contention for a resource. In general, locks that are placed automatically by the system are the weakest (least restrictive) possible, yet sufficient for maintaining data integrity for the duration of the operation.

This is best explained by an example. When a COPY operation is invoked (e.g., copy a family of objects), the system places a write lock on the source table and on each of the objects in its family. The write lock prevents other users from modifying any member of the source family during the copy operation, but does not prevent them from accessing family members for read-only operations such as viewing. The system also places a full lock on the destination table involved in the copy; this prevents other users from accessing the destination table in any way during the copy. In this instance, the destination table often does not even exist at the start of the COPY operation. Nevertheless, the system can lock it.

The ability to lock a nonexistent resource is very useful. For example, this allows a user to prevent others from creating an object during the period of time the user is doing so. Also, other users are prevented from deleting a table out from under the user (i.e., deleting the table between the time the user creates it and the time he or she first uses it).

The system of the present invention provides four types of automatic locks: family locks, record locks, group locks, and write record locks. With the exception of record locks, only the system (not the user) can place these locks, and it does so only in specific circumstances. Since the locks are automatically placed on a user's behalf, they do not restrict what he or she can do with an object; instead, automatic locks only restrict what others can do. However, if others are performing operations that lock an object, those locks restrict what the user can do (and hence what automatic locks may be placed). Each automatic lock will now be described in turn.

a) Family locks

A family lock is a write lock placed on all family members of a table, including the table itself. A family lock allows the same level of concurrency as a write lock: it prevents other users from making changes to any of the family objects.

b) Record locks

CoEdit mode allows multiple users to edit tables simultaneously and interactively, thus a lock is needed for locking individual records of a table. When the user coedits a record, the system automatically locks it. When the user finishes making changes to the record and moves the cursor to another record, the system automatically removes the lock and posts the user's changes to the table. A LockKey command is also provided for explicitly locking or unlocking a current record. User feedback is provided for indicating when a record is locked.

When a record is locked, other users can view it but cannot modify or delete it. If the user tries to change a record that is locked by another user, the system informs the user the name of the user who has locked it. The user also cannot place a write lock on a table that has locked records; thus, the presence of at least one record lock in a table has the same effect as a prevent write lock on the table.

c) Group locks and write record locks

Group locks and write record locks work in tandem to maintain referential integrity between tables that are linked by key fields through a multi-table form. The system automatically applies both kinds of locks when a user coedits using a multi-table form that expresses a one-to-many or many-to-many relationship. Like record locks, group and write record locks come into play only in a coediting environment and occur at the record level, not the table level; this approach provides the greatest amount of concurrent use. These locks are in fact record locks, locking both linked master and detail records.

If the user begins to coedit the primary key of a master record in a multi-table form, the system places a group lock on the detail records owned by that master record. This prevents other users from altering the detail records while the user alters the master (even if they are coediting the detail tables in table view, a single-table form view, or another multi-table form instead of with the same multi-table form one is using). Once the user finishes editing the master record, he or she should move off the master record—to another master record or to a detail record, or press the LockKey command key (e.g., Alt-L), the system automatically makes the same changes to the linked fields of the detail records.

Write record locks work from the opposite standpoint. The system applies a write record lock on the associated master record whenever the user opens a record or coedits an existing detail record in a multi-table form. The write record lock thus guarantees that the associated master record is not deleted or changed by others while the user is coediting the detail group of records (even if the other users are coediting the master table in table view, a single-table form view, or another multi-table form instead of with the same multi-table form the user is currently using).

The system of the present invention locks objects intelligently. In every situation, the least restrictive lock consistent with the operation the user is performing is applied. The system therefore allows the greatest possible access to tables, forms, and reports by all users. In addition, enhanced concurrency for processing queries and reports are provided. For example, in the case of an INSERT query, when the user places the Query form on the desktop, the system places a prevent full lock on the table the user is querying. When the operation is confirmed by the user, the system of the present invention places a full lock on the table while it processes the query. In some operations, the system may place locks on two or more tables simultaneously. For example, when the user copies a table (i.e., from a source table to a target table), the system automatically places locks on both the source and the target table.

2. Explicit locks

Even though the system of the present invention provides automatic locking for every operation, in most multi-user applications, the user will want to use explicit locking commands to control access to resources in addition to depending on the automatic locks. For example, the user might want to lock a table explicitly when he or she wants to make sure it is available (e.g., for continual updating). The explicit lock commands give the user more control than the automatic locks and also make it easier for the user to handle situations where a user cannot place a lock because of contention for a resource with other users.

In a preferred embodiment, the user can explicitly lock and unlock tables in two ways: by menu commands (e.g., using Tools|Net|Lock and Tools|Net|PreventLock) or by using database application programming commands (e.g., using LOCK and UNLOCK commands). In this manner, the user can place locks of varying strengths on objects, including (in order of increasing concurrency): full lock, write lock, prevent write lock, prevent full lock, and directory lock.

Both explicit and automatic locks can be active at the same time on the same object. For example, if the user employs the LOCK command to explicitly place a full lock on the Orders table and then uses the COPY command to copy Orders to Newords, he or she places both an explicit full lock and an automatic write lock on Orders. From the perspective of other users, Orders appears to have only a full lock on it, since that is the stronger of the two locks the user has placed. At the end of the COPY operation, the automatic write lock disappears, leaving the user's explicit full lock intact.

Other users can also place locks, both explicit and automatic, on objects that the user has locked. However, locks so placed must coexist with existing locks (see lock compatibility discussed above). In a preferred embodiment, attempts to place object and record locks, both automatic and explicit, are honored on a first-come, first-served basis.

Whether placed by the system automatically or by the user explicitly, a lock of a certain kind retains its same effect. For example, suppose the user want to enter new data into a Customer table (e.g., using a Modify|DataEntry command), the system places a prevent full lock on Customer. This prevents other users from changing the table's structure or from editing the table while the user is entering data into it. Then, when the user posts the new records to Customer, the system of the present invention places a prevent write lock on the table.

But suppose another user places a write lock on Customer while the first user is entering data. In that case, when the user posts, he or she does not get sufficient control over the table to finish his or her data entry operation. If the user anticipates such a situation, he or she can explicitly place a prevent write lock on the Customer table before the user begin data entry. This guarantees that the table will be available to the user when he or she wants to complete the data entry operation.

Explicit locks are used most often for multi-user applications, when the application developer needs precise control over access to tables, forms, and reports. In practice, the user should use explicit locks sparingly, since they might needlessly prevent other users from accessing objects. Instead, the user should employ the automatic locks of the system to maximize concurrent access.

Internal Operation of Locks: Lock Files

Figure 3A:
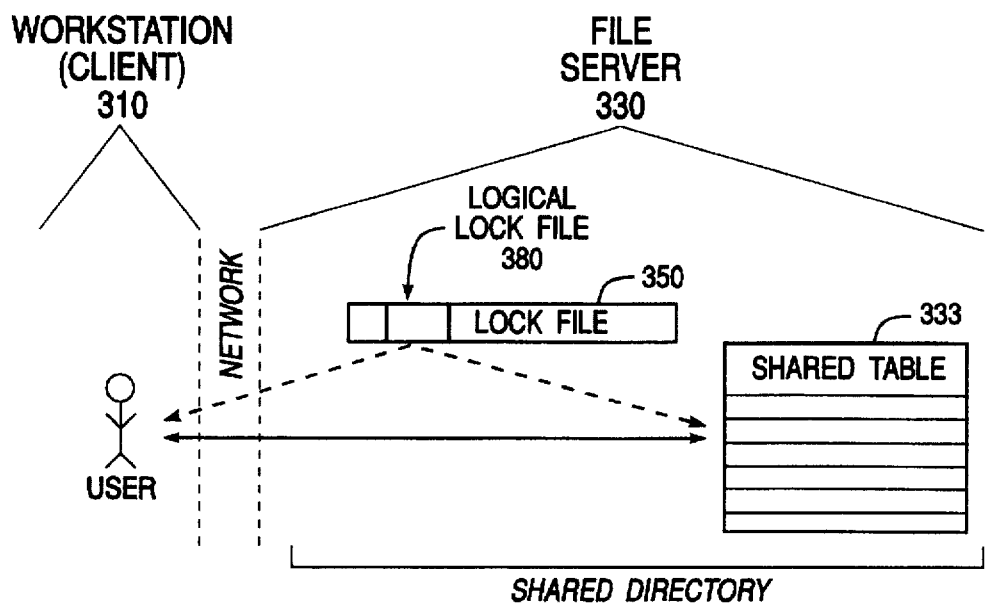
FIG. 3A is a block diagram illustrating the relationships among a user at a workstation (client), a lock file of the present invention, and a database table in a shared (network) environment.

The system of the present invention manages locks by creating a special lock file for each shared directory that users access. As shown in FIG. 3A, for example, a client 310 desires access to a shared table 333 which resides on a file server 330. The system 150, in turn, creates a "physical" lock file 350 for storing various locking and related concurrency information. In a preferred embodiment, the file 350 exists as a separate disk (i.e., "physical") file which is stored on the server 330, preferably in the same network directory as the table. Each file 350 stores at least one logical lock file 380 having locking information specific to the shared table 333 (and its family members). Unlike the physical files, however, the logical lock files do not exist as separate disk files. At the conclusion of a multi-user session for a shared directory, the corresponding physical file, together with its logical files, is deleted.

A. Physical lock file layout

Figure 3B:
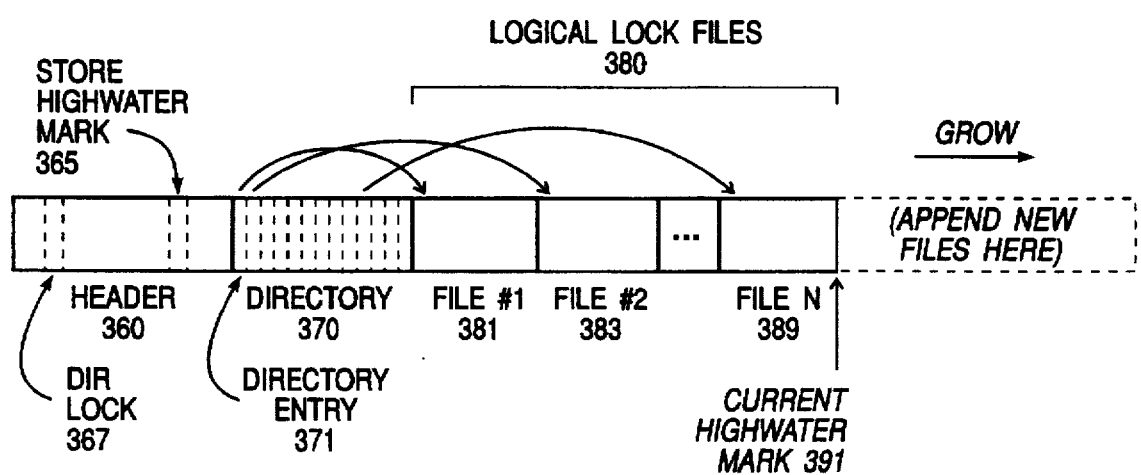
FIG. 3B is a block diagram illustrating an exemplary layout of the lock file of FIG. 3A, the lock file including a plurality of "logical" lock files.

Referring now to FIG. 3B, the structure of the physical lock file 350 will be described in further detail. As shown, physical lock file 350 stores one or more logical lock files 380. For managing these files, physical lock file 350 also includes a header 360 and a directory 370. Each of these will be described in further detail.

Header 360 includes housekeeping information. For example, header 360 stores a "highwater mark" value 365 pointing to the location (end of the physical lock file) where new logical lock files or resized existing logical files are to be allocated (appended). The highwater location varies dynamically according to the number and size of logical lock files present in the file 350. Specifically, as logical lock files are added to the physical file, the highwater mark is adjusted upward. Since logical lock files are preferably never physically deleted, however, the mark will not be adjusted downward.

Header 360 also stores a Dir Lock 367, which is a flag indicating whether a directory lock is in place. According to the present invention, a directory lock provides read-only access to all objects present in that directory (as described hereinabove). When present, the directory lock is controlling; specifically, other locks (e.g., record locks, table locks, and the like) are simply ignored (or blocked). With a directory lock in place, the remaining information stored in the logical lock files is irrelevant and, thus, need not be read.

Access into the logical lock files themselves is provided by directory 370. The directory stores an entry (e.g., entry 371) for each logical lock file. Each entry includes a name, such as a string or handle corresponding to a family name, and a pointer to the particular logical lock file being referenced. In this fashion, the directory serves as an index into the available logical lock files for a given physical lock file.

When a workstation is first accessing an object of a family (e.g., table), it checks the directory 370 for the existence of a corresponding logical lock file. In the instance that a logical lock file does not exist (no directory entry is found), one is created on the fly. Specifically, a new logical lock file is appended to the end of the existing logical lock files (i.e., at current highwater mark 391) and an entry is made in the directory 370 for referencing the file. To speed up subsequent accesses to that logical lock file, however, a workstation need only memorize (e.g., store in local memory 102) the address or offset of that logical file. The system in fact remembers (i.e., stores in memory 102) the respective location of each logical lock file read. In this manner, the directory need only be read once for each particular logical lock file accessed.

The logical lock files themselves (e.g., file 381, file 383, file 389) stores concurrency information associated with a particular database family. Each is allocated at an inital block size. Depending on operating system employed, blocks may advantageously be allocated as a multiple of a common disk unit (e.g., as byte clusters of 512, 1024, 2048, and the like). Normalizing the logical file to pre-selected block sizes not only simplifies directory maintenance but also speeds access to the concurrency information contained within the files. The latter advantage is now examined in further detail.

To minimize allocation of additional storage for a logical lock file, each block typically includes a free or buffer area, at least initially, in which the number of logical file entries stored can grow and shrink (i.e., without continually allocating additional blocks). When the initial storage capacity of a logical file (e.g., 1K) has been exceeded, the file is effectively moved to the physical lock file 350 with a larger block size (e.g., 2K). After examining the detailed structure of logical lock files, the growth of physical lock files will be described in further detail.

B. Logical lock file layout

Figure 4:
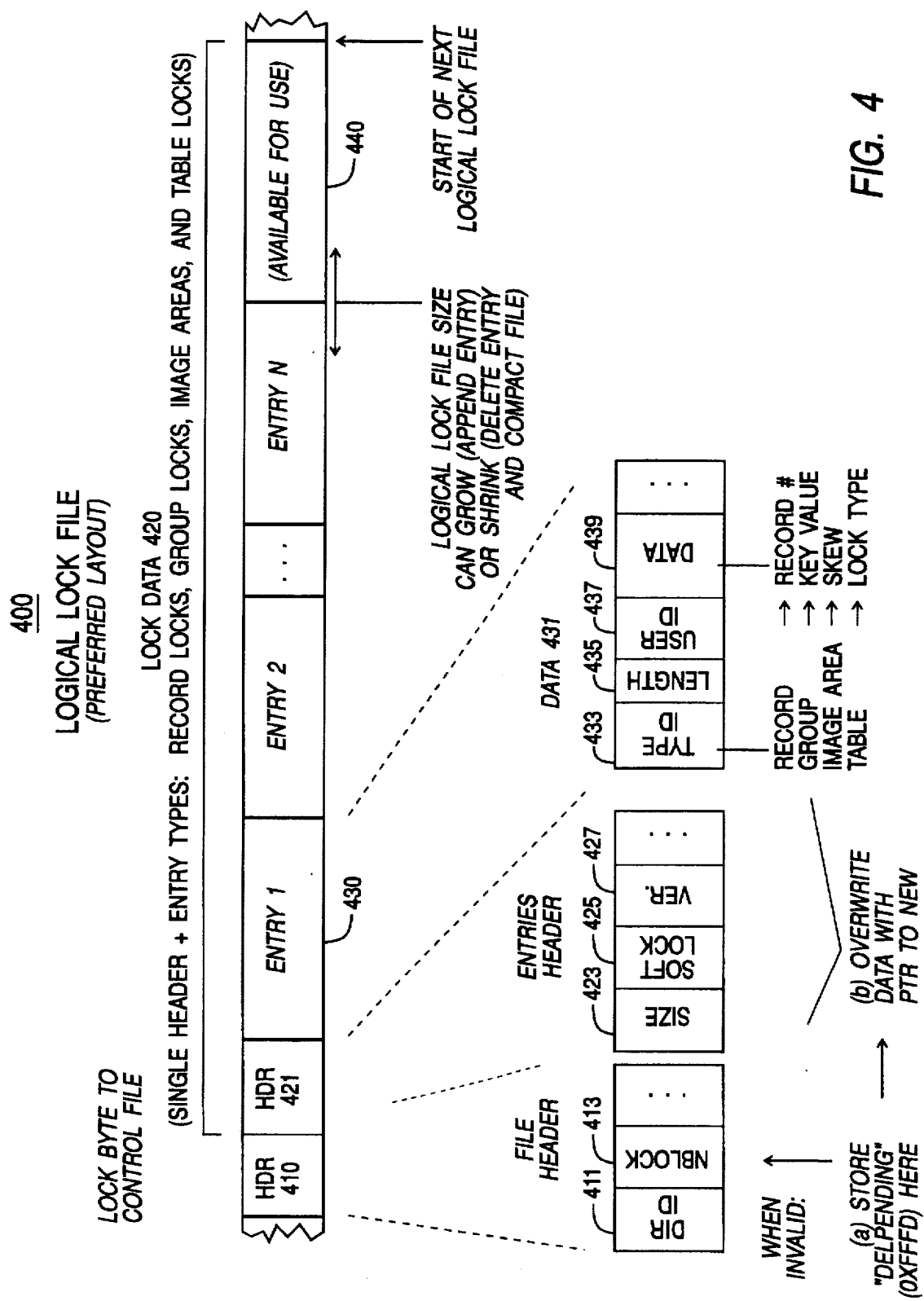
FIG. 4 is a block diagram illustrating an exemplary layout of a logical lock file of FIG. 3B.

As shown in FIG. 4, the logical lock file or table itself includes a plurality of entries for specifying the concurrency information of associated family members. A preferred layout for a logical lock file 400 of the present invention includes a header 410 and lock data 420. Basically, the header maintains housekeeping information. Lock data 420, on the other hand, stores a variable number of registration entries; exclusive access to these data may be achieved by locking a selected byte ("byte locking") of the logical file.

Header 410, as illustrated, includes Family or Dir ID 411 and NBlock 413 fields. Dir ID 411 stores information identifying the family of database objects which is associated with the logical file. Family members include a database table and its related objects, such as forms, data validation, reports, indexes, and the like. In a preferred embodiment, the base name of the database table identifies all related members of a given family. A customer table (e.g., customer.db) may have associated with it a customer form (e.g., customer.f) and a data validation file (e.g., customer.val). Any database object which shares the same base name as the table (e.g., all database objects in the family Customer.*) also employs the same logical lock file. While the base name may be stored as the Dir ID (e.g., as a text string), a simple handle scheme is preferably employed instead. All told, the approach facilitates the locking of associated members, such as locking forms and reports.

In addition to storing family information, the header 410 preferably includes information capable of redirecting a workstation to another logical file. As shown, header 410 includes the NBlock field 413 for storing the number of storage blocks allocated for the logical lock file. In the event that a logical lock file is "moved" to a new storage block(s), NBlock 413 is set equal to "DELPENDING" (i.e., delete pending), which in a preferred embodiment is defined by the value 0xFFFD. In this instance, a pointer referencing the new logical file block is also stored (e.g., by overwriting the data no longer needed). A detailed example employing this mechanism is set forth below in FIGS. 5A–D.

Logical lock file 400 stores the actual concurrency information of interest as registration entries (e.g., record 430) in the data area 420, which includes a single entry header 421. Each entry (entry or record 430) includes information completely describing a single lock or concurrent action. The single header 421 stores status or historic information for the entries, including size 423, soft (special critical section) lock 425, version 427, and the like.

Data 431, on the other hand, includes Type ID 433, Length 435, User ID 437, and Registration Data 439 fields. Type ID field 433 includes information (e.g., a special ID code) identifying the general type of information maintained. For example, an entry may be identified as a record lock, group lock, image area, table lock, or the like. User ID 437, on the other hand, identifies the actual holder (user) of the entry. Preferably, this information is stored succinctly as a handle (integer) referencing a network user.

Length field 433 stores the length of the record or entry. While most records may be standardized to a fixed length, it is also desirable to store variable information, such as a key value (e.g., for group locks). The length field provides this capability. Moreover, the length information fosters compatibility: a system need not know the length of different entry types beforehand. Instead, the information is simply read as needed.

Registration Data 439 stores the specific lock information for the entry. In a table lock, for example, Data 439 stores one of a full lock, a write lock, a prevent full lock, or a prevent write lock. In a record lock, on the other hand, Data 439 stores the record number of the record being locked. To lock a set or range of records (a group lock), Data 439 stores a key value (e.g., $3,000). This is useful for a one-to-many relationship: the detail table may be conveniently locked by the key of the master table.

Since different users may have disparate views of the same non-keyed tables, Data area 439 stores information for synchronizing non-keyed tables. If one user, for example, inserts several records before (above) a current record for a second user, the record number for that current record, as seen by the second user, is no longer valid. According to the present invention, in this instance the workstation modifying the shared table examines the lock file to update the image area for other users. In a preferred embodiment, a skew or synchronization factor is added to the image area entries of others, thus adjusting the relative position of the records as viewed by different users. For keyed tables, in contrast, sufficient information already exists in the primary key (i.e., index file) for adjusting relative positions, all without accessing lock files.

In actual operation, the individual workstations effect locks by adding and deleting relevant registration entries to the corresponding logical lock file. To add a full lock to a Customer table, for example, a workstation would register with the Customer logical lock file an entry specifying a table lock (Type ID), the holder (User ID), and a full lock (Lock Data). Before such as entry is permitted, however, the system verifies that no incompatabilities occur with existing entries. In this manner, a logical lock file serves as a list which may be sequentially processed for determining lock information for various objects of a family.

As locking information for a family of objects may be continually changing, logical file 440 includes a buffer zone or area 440 for accommodating a variable number of registration entries. In this fashion, related concurrency information may be maintained together for rapid sequential access. According to the present invention, however, additional methodologies are provided for even further improving access.

c. Logical lock file growth

The locking scheme of the present invention includes novel techniques for controlling the addition and revision of locking information. To optimize performance, a particular logical file is preferably always accessed in one contiguous read, thus minimizing the performance penalty for additional I/O operations. This may be achieved by maintaining logical lock files as self-contained blocks.

According to the present invention, a logical lock file is created at an initial block size, such as one kilobyte (1K). The entries of the file are stored compacted, without any particular linking information. For example, new entries are simply appended to the end (i.e., at the beginning of the free area); dead entries, on the other hand, are squeezed out during compaction of the logical file. During this time of actually modifying (writing to) a logical file, the accessing workstation maintains exclusive control over that file (e.g., through byte locking).

Growth of logical files (and hence underlying physical file) is controlled as follows. When increased storage is required (e.g., when numerous concurrent users are present), the storage currently available for the logical lock file (e.g., 1K) may be insufficient; additional storage must be allocated. According to the present invention, the storage for the logical lock file is not increased by chaining a new storage block to the old one (e.g., through a pointer). Instead, an entirely new logical lock file, one having a larger block size (e.g., now at 2K), is created in the physical lock file.

Figure 5A:
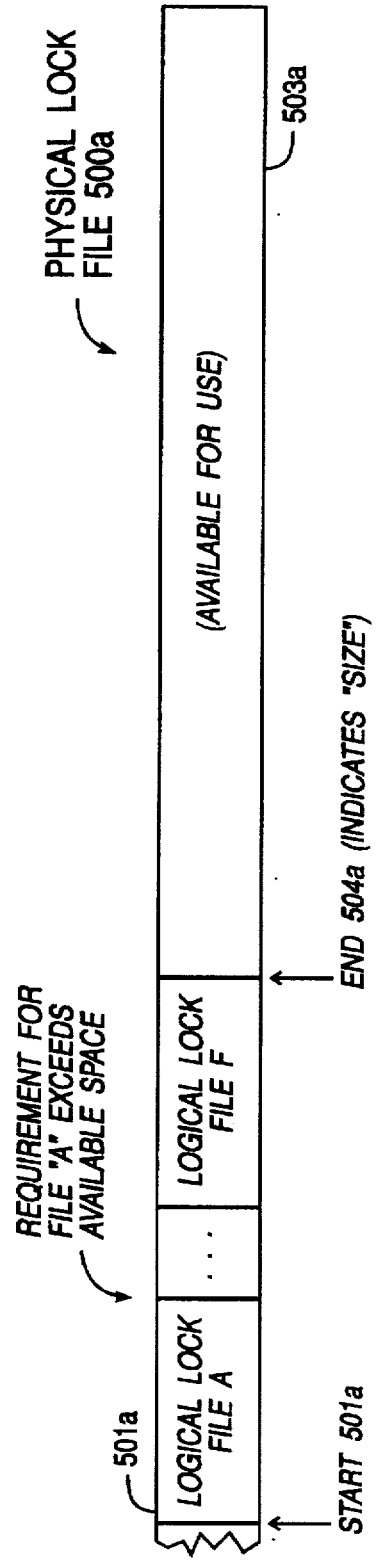

Referring now to FIGS. 5A–D, this operation is illustrated. FIG. 5A illustrates a physical lock file 500a having a plurality of logical lock files. Suppose, for example, that the storage requirement for logical lock file A (501a) exceeds that currently allocated for the file. As shown, additional space 503a is available towards the end of the physical lock file 500a.

Figure 5B:
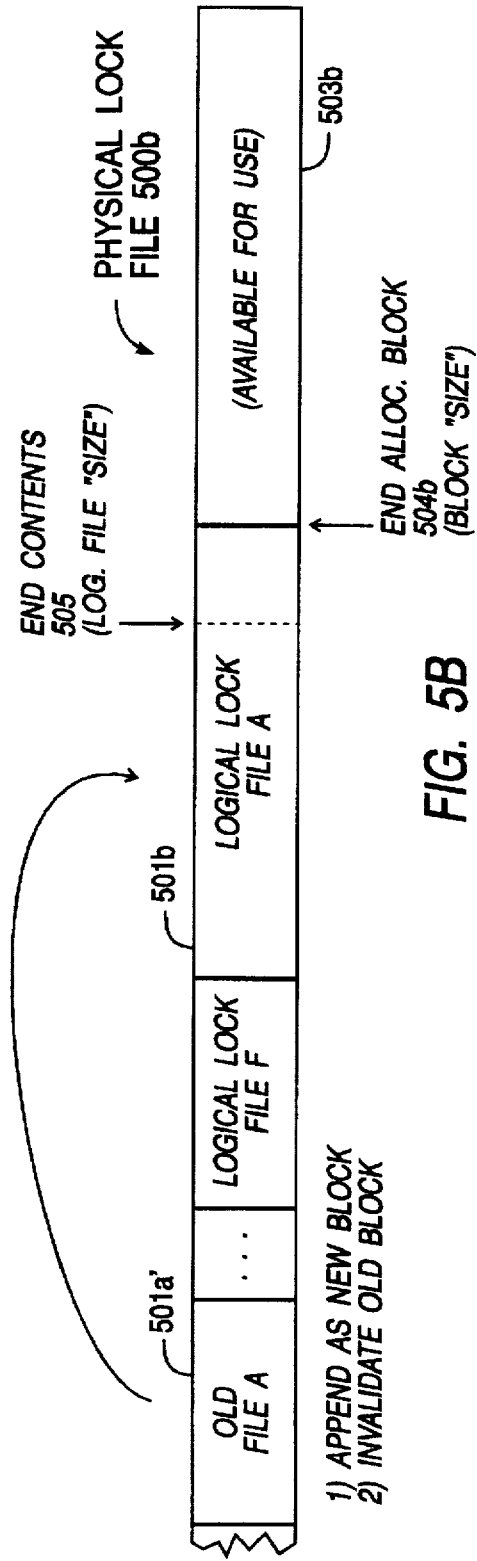

According to the present invention, additional space for logical lock file A is allocated as follows. As shown in FIG. 5B, an entirely new logical lock file A (501b) is appended to the end of the existing lock files (i.e., at the beginning of available space 503a). The new file (501b), which is allocated twice the original size (i.e., now with two 1K storage blocks), stores current entries as well as any new entries for the logical file. As shown, available or free space 503a shrinks accordingly (now space 503b). To complete the operation, logical lock file A (501a) is now marked as an invalid block (501a'). The invalidation is achieved by enabling a pointer which points from the old block 501a' to the new block 501b. Two items of interest are memorized: a) allocated or maximum size of the logical lock file (ends at 504b), and b) actual size used (bytes of content) in the logical lock file (ends at 505). The latter is used for predictive reading, which is fully described below.

At this point, two different perspectives exist for the physical file. For the current workstation (i.e., the one effecting the change), the physical lock file appears as file 500b of FIG. 5C. Specifically, logical lock file of interest, file A (501b), has a new starting location 502b and ending location 507. Thus, access to file A will include a seek to location 502b, followed by a read from location 502b to no more than location 507 (and typically much less).

Other workstations, specifically those which have not accessed file A since its re-allocation, will have an outdated perspective. As shown by FIG. 5D, a subsequent workstation will initially access (seek to) starting location 502a— where it expects to find File A. Once at that location, however, it finds that the block (now block 501c) no longer contains valid locking information; instead, the block contains a pointer to new storage block (501b) where the newly allocated file A is stored. In essence, the other workstations are told that the logical lock file has been moved from the first block to a larger second block. Once a workstation has received this notification (that it should access file A at the second block), the workstation will then continue accessing the second block for needed locking information, at least until it is notified of yet another change. Specifically, the offset of interest (offset 502b) is stored locally (e.g., in memory 102) so that subsequent access to the file A may occur directly, i.e., without traversing any pointers or re-reading the directory. In this manner, lock files remain contiguous and, at the same time, file I/O operations are kept to a bare minimum.

D. Improved access: predictive reads

By "predictively reading" the logical lock files, additional performance gains may be realized. Specifically, each workstation remembers the location and size of a lock file and a predictive amount. On the next read of that file, the workstation seeks to the memorized location and reads the memorized size plus an additional or predictive amount (size read=size from prior access+predictive amount). In the event that a prior size is not known, one may be simply guessed (e.g., defaults to 80% of block size).

Suppose, for example, a workstation accesses a logical lock file having a size of 550 bytes. On a subsequent read of this file, the workstation may predict that the lock file will grow in size—that new registrations entries will be added. Instead of just reading 550 bytes, the system may read more, 800 bytes for example. In the event that the logical file is shrinking, on the other hand, the system will read less. In this manner, a logical lock file will always or substantially always be read in a single I/O operation.

Referring now to FIGS. 6A–B, the operation of predictive reading is illustrated. In FIG. 6A, logical lock file 600a stores a plurality of entries, spanning from beginning offset 601 to ending offset 603. Thus, the current size (of entries) is illustrated by size 607. Upon subsequent access of the file 600a, a workstation could simply read just the information between offsets 601 and 603. If additional records exist beyond offset 603, however, that approach would require a second read operation, thus incurring a substantial performance penalty. By adding a predictive amount 609 to the previous size 607, the system of the present invention intelligently reads the file, thus minimizing or eliminating additional file I/O operations.

This approach is further illustrated in FIG. 6B. To read logical file 600b, the workstation first seeks to location 601. Next, a single, sequential read is performed from location 601 to location 613. In this manner, entries added since the last read (e.g., new entries 611) are read without an additional file I/O operation. While more bytes will typically be read than is absolutely necessary, these additional bytes may be simply ignored (i.e., need not be further processed)—the performance penalty for two or more reads of a physical disk substantially outweighs any disadvantage from an intelligent single read of additional bytes. For networking systems (e.g., Novell's Netware) where the performance penalty for file I/O operations is high, the methodology is particularly advantageous.

In the unlikely event that a predictive read fails to read sufficient information or faults (e.g., when the file has moved), an additional file I/O operation may be performed. The worst possible case for predictive reading, however, fares no worse than conventional techniques. Moreover, the predictive amount and the logical file block size may be dynamically adjusted to minimize or virtually eliminate such faults; at the same time, when the size of the lock file decreases, the size of the predictive read decreases as well.

E. Byte locking

Using the techniques of the present invention, once a logical lock file has been created, each workstation knows where to find the locking information. To actually alter the contents of a logical lock file, however, a workstation may obtain exclusive control over the file. A byte lock is employed for this purpose.

Byte locking or record locking occurs as follows. Given a file, a particular byte may be locked by a single user. For each logical lock file, a critical section (i.e., a portion that only one process can modify at a time), such as a particular byte, may be specified for locking. In operation, a byte lock is held for a very short period of time—only the time required to perform the actual update of a logical lock file. After processing the lock information, the system simply releases the byte lock (instead of closing the file). In this manner, the system requires only a single file handle for the physical lock file (instead of one for each logical lock file).

Since locking of a byte is an exclusive event, a mechanism is provided by operating systems for controlling conflicts. In Microsoft's MS-DOS, only a simple system is provided: if an attempt is made to lock a byte which is already locked by another, the system only returns an error code. For these types of systems, therefore, a polling mechanism is employed to resolve conflicts of byte locks. In more advanced networking environments, such as Novell's Netware, a queuing mechanism is typically provided, thus eliminating the need to poll byte locks. In these latter systems, the lock requester may wait for any pre-existing byte lock to be removed (e.g., within a specified timeout period).

All told, the system of the present invention adapts to the growing and shrinking of lock information in the logical file. By employing byte locking technique, individual lock files may be managed with a minimum of system overhead.

F. Preferred method for locking objects

Figure 7A:
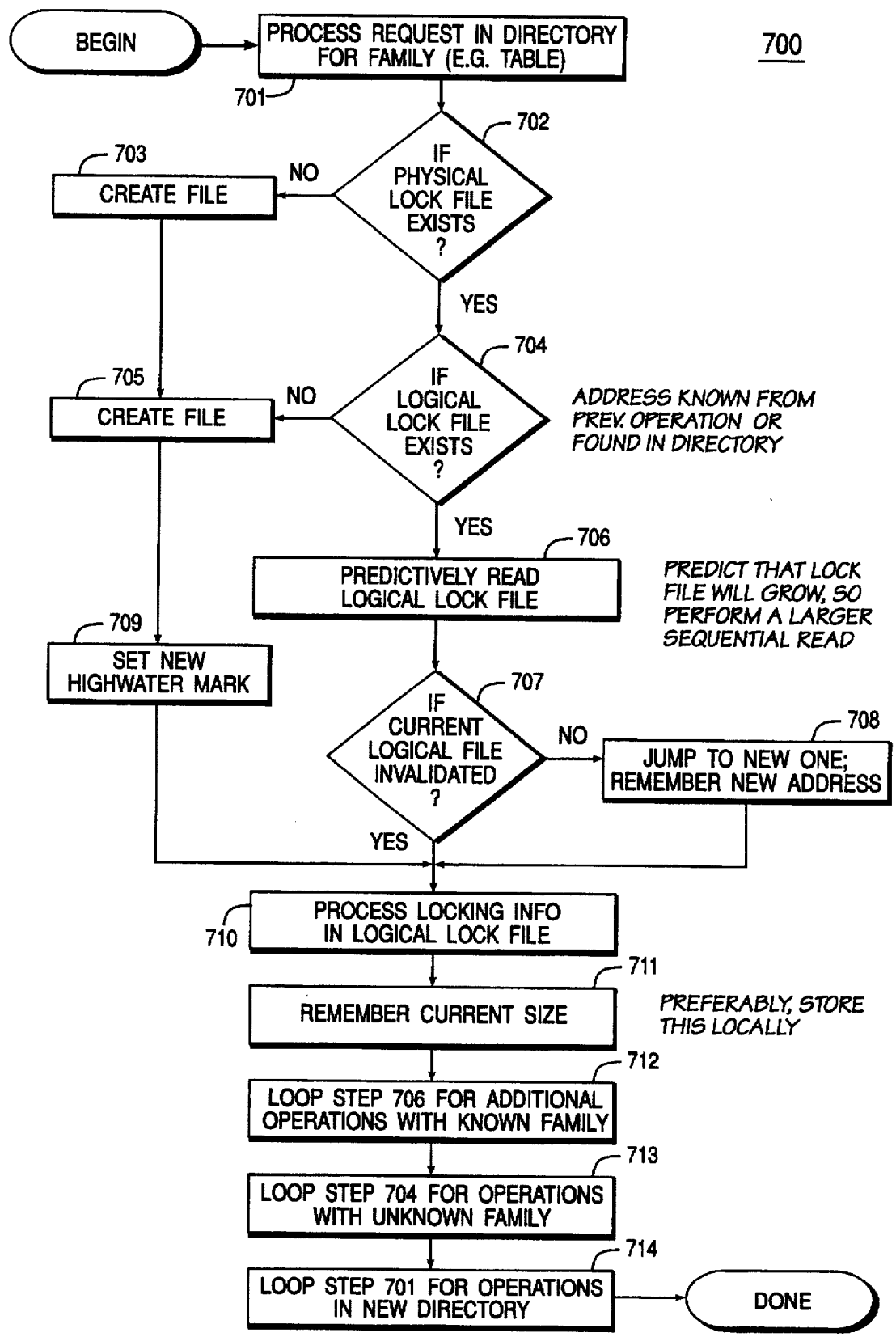
FIGS. 7A–B are a flowchart illustrating a method of the present invention for locking shared objects, including the creation and maintenance of a lock file of the present invention.

Referring now to FIG. 7A, a method 700 for locking objects in accordance with the present invention will now be described. In step 701, a request is received for access to a shared object of a family (e.g., table or related member). At step 702, the method 700 checks to determine if a physical lock file exists for the requested object. If no, then one is created in step 703. Otherwise (yes at step 702), the method skips step 703. At step 704, the system checks for the existence of the logical lock file: either the address is already known (i.e., stored locally from previous read), or found in the directory 370. If no address can be found (i.e., the file does not exist), then the logical file is created (block allocated) in step 705. In this instance, the highwater mark (of FIG. 3) is set to point to the end of the last file block. Otherwise (yes at step 704), the method skips steps 705 and 709.

After creating a new physical and/or logical file and updating the high water mark, the method proceeds to step 710. If the logical file is found (yes at step 704), however, then in step 706 the method reads the file after seeking to its offset (beginning address). Since it can be predicted that the lock file will grow, the step performs a larger sequential (predictive) read than would normally be done. In particular, the read includes an amount equal to the size from the previous read plus an additional (predictive) amount. In a streamline embodiment, the predictive amount may be arbitrarily set and then empirically adjusted until an optimum value is obtained; specifically, the value is increased or decreased until read faults are minimized. In a more complex embodiment, expert system techniques, employing a knowledge base and inference engine, may be provided for intelligently determine an optimum value. The design and implementation of expert systems is known in the art. See e.g., Klahr, P. *Expert Systems: Techniques, Tools and Applications*, Addison-Wesley, 1986; the disclosure of which is hereby incorporated by reference.

At step 707, if the currently accessed block of the logical lock file is invalid, then the system will jump to the new valid logical file block (by reading a pointer to it) at step 708; the new address is now remember (stored) locally. To increase performance, often-accessed information, such as offset address, is stored locally (i.e., in the system memory of the workstation), preferably in cache memory (e.g., memory 109). If the current logical file is not invalidated however (yes at step 707), then step 708 is skipped.

At step 710, the locking information within the logical lock file of interest is processed; this step is described in further detail below in FIG. 7B. At step 711, the method remembers the current size of the logical lock file. Again, this information is preferably stored in local memory. At step 712, the method loops back to step 706 for new operations with known families. At step 712, the method loops back to step 704 for new operations for unknown families. At step 714, the method loops back to step 701 for operations in a new directory. At the conclusion of these steps, the method has completed.

Figure 7B:
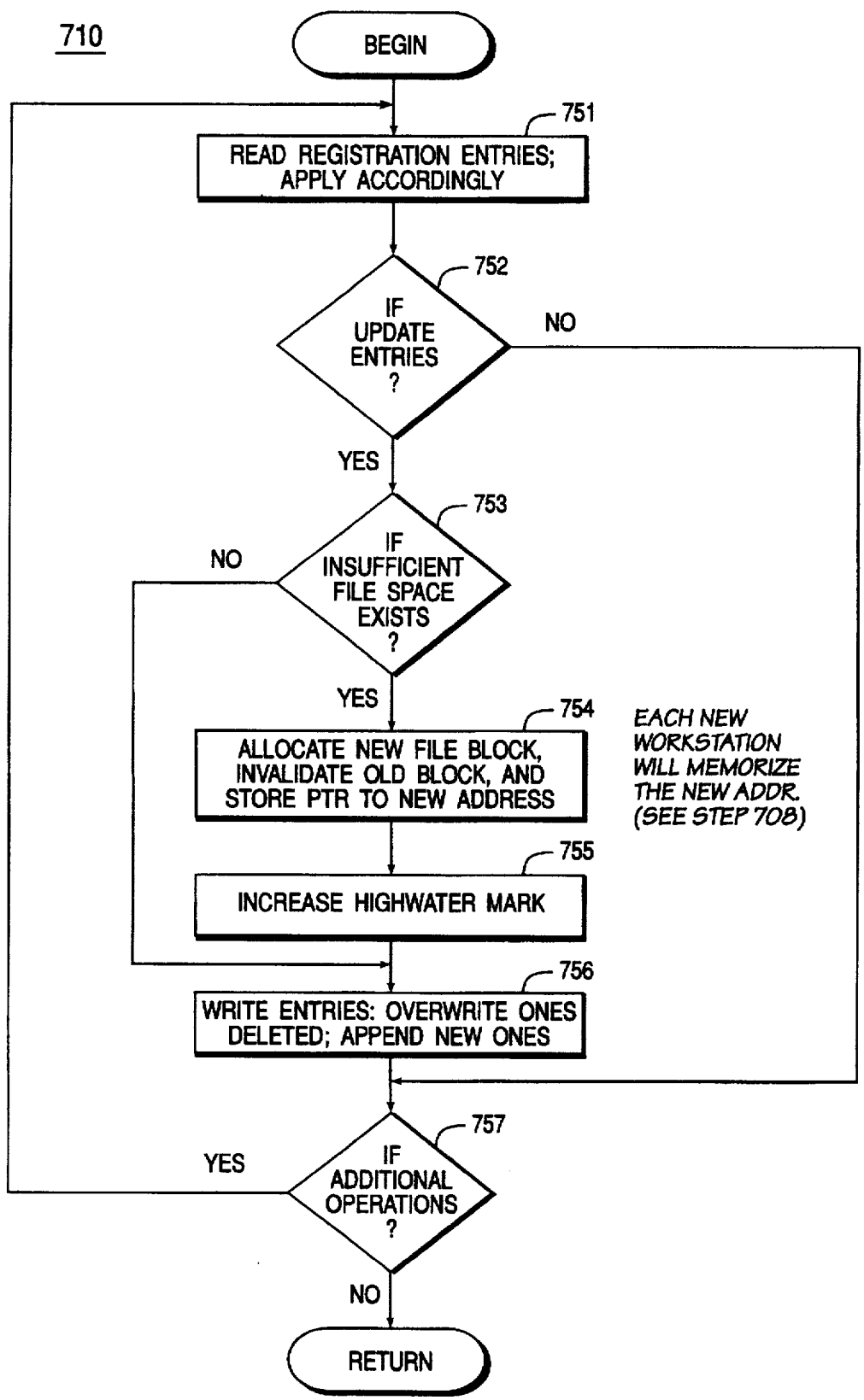

Referring now to FIG. 7B, the individual substeps of step 710 (from method 700) are illustrated. At step 751, the method reads registration entries and applies the information (i.e., effects the necessary locks) accordingly. At step 752 if new entries are to be update, then method proceeds to step 753 to test whether there is sufficient space present in the file block. Otherwise (no at step 752), the method jumps to step 757. If insufficient space exists for new entries, then a new block is allocated at step 754 for the logical lock file. The old file block is invalidated, and a pointer to the new block is stored. Upon reading the pointer to the new address, subsequent workstations will memorize the new address (see step 708). At step 755, the highwater mark is increased by an amount equal to the newly allocated file block. If, on the other hand, sufficient space does exist at step 753, then steps 754 and 755 are skipped. At step 756, the method updates the registration entries, as needed, by writing to the logical lock file; a byte lock is temporarily employed on the logical file during the step. Finally at step 757, if additional operations are to be performed on this object family, then the method loops to step 751 accordingly. Otherwise, the method returns.

Attached hereto is an Appendix A further describing techniques for managing locks in a database command language application. User and programmer guides and additional reference materials providing additional description for the system of the present invention are provided as Appendix B. Also attached hereto is a microfiche Appendix C containing source listings in C programming language illustrating exemplary declarations for the lock files of the present invention.

While the invention is described in some detail with specific reference to a single preferred embodiment and certain alternatives, there is no intent to limit the invention to that particular embodiment or those specific alternatives. For example, application of the present invention is particularly advantageous in those architectures having shared resources, including not only multi-user platforms but also multi-tasking ones as well. Thus, the true scope of the present invention is not limited to any one of the foregoing exemplary embodiments but is instead defined by the following claims.

Appendix A

Managing locks in a programmed database application

Design goal

An important consideration in designing any multi-user application is deciding how to resolve simultaneous requests for the same resources. Apply the weakest locks possible; for example, do not lock an entire table when locking a record suffices, and do not use a full lock when a write lock is sufficient. Application of these principles in the system of the present invention will now be described.

Use of locking commands in application programs

LOCK and UNLOCK commands are provided to place explicit table locks. Both LOCK and UNLOCK take as arguments a comma-separated list of one or more pairs of strings representing table names and keywords representing lock types. The following command, for example, places a full lock on the Orders table and a write lock on the Stock table:

LOCK "Orders" FL, "Stock" WL

Keywords WL and FL are defined for write lock and full lock, respectively. Regardless of result obtained (success or fail), the LOCK command always completes its job. For example, if the user attempts to place more than one lock in a single LOCK statement, as above, the command will ensure that either all the locks are placed or none of them. This feature lets the user avoid application deadlocks. Also, LOCK sets a special system variable—Retval—to True or False, depending on whether all the locks were successfully secured.

In the event the locking attempt fails, error-code functions (ERRORCODE(), ERRORMESSAGE(), and ERRORUSER()) are provided. For example, if Orders were in use by another user named Ralph when the user issued the preceding LOCK command, ERRORCODE() would return 3 (Table in use), ERRORMESSAGE() would return the string "Orders table is in use by Ralph", and ERRORUSER() would return the string "Ralph". ERRORCODE() returns 0 if the lock succeeds. As good programming practice, the user should either interrogate Retval or use ERRORCODE() after attempting to place explicit locks. It is often convenient to place the LOCK command and the related test on Retval or ERRORCODE() in a WHILE loop, as

```
WHILE (True)
  LOCK "Employee"
  IF (Retval)                          ; lock succeeded?
    THEN QUITLOOP                      ; then continue beyond loop
    ELSE MESSAGE ERRORMESSAGE()        ; show user the error message
  ENDIF
  ...                                  ; rest of module
ENDWHILE
```

What is placed in the ELSE clause in this code depends upon the application. For example, it might be appropriate to ask users whether they are willing to wait for the table to be free. If a user has structured the application in such a way that it will be tied up for only a very short period of time, he or she may just want the application program to display a Waiting... message, pause for a second using the SLEEP (delay) command, then loop back to the top of the WHILE. The user should avoid looping without first pausing, as this will load the network unnecessarily. A SETRETRYPERIOD command may also be employed to build an automatic retry period into the LOCK command itself.

As soon as an explicit lock is no longer needed, the UNLOCK command should be used to release it. For example, to undo the locks on the Orders and Stock tables in our earlier example, execute:

UNLOCK "Orders" FL, "Stock" WL or use:

UNLOCK ALL which releases all explicit table locks which have been placed.

ARESET command is also provided, which releases all explicit table locks. Since locks are not automatically released when script play ends (but are released when the user exits from the system), one should execute a RESET command near the end of the script in order to clear the workspace, undo all locks, and clear any passwords that have been presented during the course of running the application.

Deadlock

Situations exist in which contention for resources in a multi-user environment can lead to "deadlock"—when two elements in a process are each waiting for the other to respond. For instance, suppose two users, Ken and Dick, both need to lock Orders and Stock. Say Ken has successfully locked Orders and is attempting to lock Stock; meanwhile, Dick has locked Stock and is attempting to lock Orders. Each of the two users is waiting on a resource held by the other, producing a deadlock.

The LOCK command, because it gives the user the ability to lock more than one table at once, has built-in deadlock prevention. If Ken executes:

LOCK "Orders" FL, "Stock" FL at exactly the same time that Dick executes

LOCK "Stock" FL, "Orders" FL one of the two will secure a lock on both resources, while the other will fail to lock either. A key to avoiding deadlock situations is to attempt to lock all the resources the user needs for a particular operation with a single LOCK statement. If the user structures the application by using small modules and by locking all the tables the user needs at once, deadlocks can be avoided.

Multiple locks on one table

The user can explicitly place two or more different types of locks on the same table simultaneously. For example, LOCK "Orders" WL, "Orders" PWL attempts to place both a write lock and a prevent write lock on the Orders table. The write lock keeps other users from modifying the table; the prevent write lock keeps other users from blocking the user's modifications.

When applying multiple locks to a single table, each explicit lock should be paired with an explicit unlock of the same type. An object is not unlocked until the user removes as many locks as that user placed. Note that placing two or more of the same type of lock on a single table does not alter the effect of the lock. However, the ability to apply multiple locks of the same type can sometimes simplify flow of control in programs. For example, this ability permits a script or procedure to perform a LOCK followed by an UNLOCK without undoing a lock already secured by a calling script or procedure.

Determining the status of locks

A LOCKSTATUS() function is providing for determining whether (and how many times) the user has explicitly placed a certain type of lock on a table. For example, the function call LOCKSTATUS ("Orders", "WL")

returns 0 if the user has not placed any write locks on Orders, or 2 if the user has placed two write locks. The keyword ANY as the second argument lets the user determine how many locks of whatever type the user has placed on the table.

LOCKSTATUS() reports only the user's own locks—not those of other users. A menu command (e.g., Tools¦Info¦Lock) is provided to get a list of all the locks other users have placed on a table. However, the usefulness of this information may be of limited value in an application: another user or process can always place or release a lock an instant after the user inquiry is made.

Record locking

Coedit mode is unique in that it lets the user lock individual records of a table. Locking a record prevents other users from modifying or deleting it for the duration of the lock; however, they can still view it. When another user moves to a record that the user has locked, it has the same value as it did at the time the lock was placed. When the user subsequently unlocks the record, the user's changes are posted to the table and can then be seen by other users.

From the standpoint of an application, record locking serves two purposes. First, it provides the user with the exclusive ability to make changes to a given record. Second, it forces a "refresh," so that the user is guaranteed to be working with the most up-to-date field values. While a REFRESH command (and the keyboard equivalent Alt-R) may be employed, it is not particularly useful in an application: another user might make a change an instant after the command is executed. Thus, even if the very next statement after the REFRESH interrogates the value of a field, the user could still get an obsolete value. Therefore, if the user is in a situation in which other users might be changing or deleting a record the user wants to examine, he or she should lock it before examining it even if he or she does not intend to change it. In this manner, the user can guarantee that he or she is working with the record's current value.

There are also situations where the user's script is periodically examining a record, waiting for a value to change. In this instance, the user should preferably not lock out other users of the record (since they be unable change it). Here, a REFRESH right before the test is preferred.

Locking and unlocking records

Like table locks, record locks can be placed either automatically, by performing an action that modifies a record, or explicitly, by using the LOCKRECORD command. Similarly, record locks can be released either automatically by moving the cursor to a different record or explicitly by using UNLOCKRECORD. The user should usually rely on automatic record locking and unlocking within a programmed application in those instances where the user is sure the lock cannot fail. In all other circumstances, the user should lock and unlock records explicitly, using the LOCKRECORD and UNLOCKRECORD commands. This is because, unlike the system's automatic record-locking mechanism, the LOCKRECORD command does not produce a script error if it cannot obtain a record lock because of a resource conflict. Instead, it sets Retval to False and sets an error code, which the user can then interrogate with the ERRORCODE() function or the ERRORINFO command.

In some cases, there are no automatic locks applied to satisfy the needs of an operation. For example, suppose the user's application lets users view, add, and delete records, but never change existing records. One might think that the following code works:

```
MOVETO [Name]
LOCATE "John Doe"
IF (Retval)
    THEN DEL
ENDIF
```

While this may always work, it is not guaranteed to. If another user deletes the record the instant after it is found by LOCATE but before it is deleted by DEL, the user will get the message "Another user deleted record". A more thorough approach would be:

```
MOVETO [Name]
LOCATE "John Doe"
IF (Retval)
    THEN LOCKRECORD
    IF (Retval)
        THEN DEL
        ELSE MESSAGE "Cannot lock record."
    ENDIF
ENDIF
```

The user can also lock and unlock records explicitly using the LOCKKEY command, which is the PAL™ equivalent of pressing Lock Toggle Alt-L. However, the LOCKRECORD and UNLOCKRECORD commands are both more versatile and less likely to result in coding errors and are, thus, preferred instead.

Using the LOCKRECORD and UNLOCKRECORD commands

In order to completely understand how LOCKRECORD and UNLOCKRECORD work, it helps to remember that there are two basic ways in which the user can coedit a record: The user can make changes to a record that already exists, or the user can enter a brand new record that has not yet been posted to the table.

To examine or modify an existing record under script control in a multi-user environment, the record is made current and then LOCKRECORD is executed. The user can then interrogate Retval to determine if the attempt at locking was successful. If the lock succeeded, Retval will be set to True; otherwise, it will be False. (The user can also use the RECORDSTATUS() function to test if a record is locked.)

When a lock fails, the user can use the ERRORCODE() function to determine why. The most likely possibility is that some other user has already locked the record. Other possibilities are that another user has placed a write lock on the table or that the record the user tried to lock was deleted. The user can supplement the information returned by ERRORCODE() by using the ERRORMESSAGE() function, which returns an appropriate error message, such as "Record is locked by John". The user can also use the ERRORUSER() function to determine who locked the record.

If the lock attempt is successful, on the other hand, the application can proceed to examine or change the record. When processing the record has completed, one should use POSTRECORD to post any changes and to specify whether or not the record should remain locked. Like LOCKRECORD, UNLOCKRECORD sets Retval to True or False depending on whether it succeeded. Unless key fields of the locked record were modified to match the key of some other existing record (in which case, a key conflict would arise), the UNLOCKRECORD command will succeed.

Posting records

When the user opens up a new blank record (e.g., by inserting a new record into a table) and begins entering data into it, the new record does not actually exist in the table until the user posts it. A record that has not yet been posted to a table cannot be locked. More particularly, if a record has not yet been posted, there is no need to lock it because other users cannot access it. When the user is ready to post the record to the table, he or she can post it with POSTRECORD, which includes the following syntax:

POSTRECORD[NOPOST|FORCEPOST|KEYVIOL][LEAVE-LOCKED]

If there is no key violation, the record is always posted. If there is a key violation, the first parameter specifies what action to take: NOPOST does not post a record if a key violation occurs. If the first parameter is omitted, NOPOST is assumed. FORCEPOST always posts a record, even when a key violation occurs, unless the record is on a master table and a detail depends upon it. If the record has a dependent detail, a script error will occur. KEYVIOL leaves the record in a key violation state (described in further detail below). If the LEAVELOCKED parameter is specified, the record remains locked and current after the post. If LEAVELOCKED is not specified, the record is unlocked and the system of the present invention may not keep it current (that is, the record may "fly away" to a new position in the index sequence). LEAVELOCKED is ignored if the post fails for any reason.

If a record is posted with POSTRECORD, Retval is set to True; otherwise, Retval is set to False. POSTRECORD provides a high degree of control when coediting or posting records. A program can enter enough of a record to uniquely identify it on a network, one should post it to check for key violations, and then finish filling out the data. The user can also use LOCKRECORD and UNLOCKRECORD to post a record. In this context, the main difference between these two commands is that LOCKRECORD both posts and locks the new record, whereas UNLOCKRECORD just posts. In addition, in the case of a keyed table, LOCKRECORD makes the new locked record the current record in the table; this means that the cursor follows the record as it is posted in its key sequence. UNLOCKRECORD, on the other hand, only causes the new record to be posted; in the case of a keyed table, the record can "fly away" because the cursor moves to its rightful place in the key sequence of the table. In either case, one can use Retval and ERRORCODE() to determine whether the operation succeeded. A failure may occur in only two possible situations: either the table was write locked by another user or a key conflict occurred.

What is claimed is:

1. In a multi-client data processing system, an improved method for storing files on a storage device, the method comprising:

storing a plurality of files as a plurality of logical files stored in a single physical file, said physical file residing as a single disk file on a storage device, each logical file being stored as a contiguous sequence of uniform storage blocks in the physical file;

storing with the physical file a directory describing each logical file stored within the physical file;

receiving a first request from a client for information from a particular logical file;

in response to said first request, determining from said directory where said logical file is located in said physical file, and storing at the client information comprising a pointer describing that location, so that a subsequent request for the logical lock file can be satisfied without the directory;

receiving a second request from another client for storing in the logical file new information which causes overflow of the logical file;

in response to said second request, storing the new information by:

(i) appending to one end of the physical file a sufficient number of new uniform storage blocks for storing the new information, (ii) storing information for the logical lock file together with the new information being added in said new uniform storage blocks, (iii) marking storage blocks which previously comprised the logical file as invalid, and (iv) storing with the invalidated storage blocks a pointer which points to said storage blocks being appended to said physical file; and as each client requests access to information stored in the logical file, updating the pointer stored at the client to reference a location in the physical file where the new storage blocks have been appended.

2. The method of claim 1, wherein each uniform storage block is allocated as a multiple of a disk sector size.

3. The method of claim 2, wherein said appending step includes appending the uniform storage blocks as a contiguous sequence of storage blocks, so that said logical file can always be read from disk in a single disk read operation.

4. The method of claim 1, wherein each logical file itself includes a directory describing contents stored at that file.

5. The method of claim 1, further comprising:

storing a high water mark in the physical file for indicating where new storage blocks can be appended.

6. The method of claim 1, wherein said directory stores information for locating said logical files, said directory including a plurality of entries each of which stores a starting address for one logical file.

7. The method of claim 1, wherein each particular logical file includes a header storing a flag for indicating whether the particular logical file has moved within said physical file.

8. The method of claim 7, wherein said logical file header for the particular logical file stores a pointer to a new logical file if said flag indicates that the logical file has moved.

9. The method of claim 1, wherein each at least one logical file stores concurrency information specific to a particular resource shared among multiple clients.

10. The method of claim 1, wherein said physical file is a separate disk file stored on a server computer, and wherein one physical file is created for each directory of the server computer which has resources being shared among multiple clients.

11. The method of claim 1, wherein each logical file comprises a number of uniform storage blocks allocated within said physical file as a multiple of a common disk unit.

12. The method of claim 1, wherein said physical file comprises a physical lock file and wherein said plurality of logical files comprise a plurality of logical lock files, each logical lock file storing information for accessing particular resources of a database, said physical lock file having a plurality of uniform storage areas each of which stores no more than one logical lock file.

13. A multi-client data processing system comprising:

a server computer storing a plurality of files as a plurality of logical files stored in a single physical file, said physical file residing as a single disk file on a storage device of said server computer, each logical file being stored as a contiguous sequence of uniform storage blocks in the physical file, said physical file including a directory describing each logical file stored within the physical file;

a client computer capable of generating a first request from a client for information from a particular logical file;

means, responsive to said first request, for determining from said directory where said logical file is located in said physical file, said means storing at the client computer information comprising a pointer describing that location, so that a subsequent request for the logical lock file can be satisfied without the directory;

means for receiving a second request from another client computer requesting storage of new information in the logical file, said new information causing overflow of the logical file;

means, responsive to said second request, for storing the new information by:

(i) appending to one end of the physical file a sufficient number of new uniform storage blocks for storing the new information, (ii) storing information for the logical lock file together with the new information being added in said new uniform storage blocks, (iii) marking storage block which previously comprised the logical file as invalid, and (iv) storing with the invalidated storage blocks a pointer which points to said storage blocks being appended to said physical file; and means for updating the pointer stored at the client computer to reference a location in the physical file where the new storage blocks have been appended, as each client requests access to information stored in the logical file.

14. The system of claim 13, wherein each uniform storage block is allocated as a multiple of a disk sector size.

15. The system of claim 14, wherein means for storing the new information includes:

means for appending the uniform storage blocks as a contiguous sequence of storage blocks, so that said logical file can always be read from disk in a single disk read operation.

16. The system of claim 13, wherein each logical file itself includes a directory describing contents stored at that file.

17. The system of claim 13, further comprising:

means for storing a high water mark in the physical file for indicating where new storage blocks can be appended.

18. The system of claim 13, wherein said directory stores information for locating said logical files, said directory including a plurality of entries each of which stores a starting address for one logical file.

19. The system of claim 13, wherein each particular logical file includes a header storing a flag for indicating whether the particular logical file has moved within said physical file.

20. The system of claim 19, wherein said logical file header for the particular logical file stores a pointer to a new logical file if said flag indicates that the logical file has moved.

21. The system of claim 13, wherein each at least one logical file stores concurrency information specific to a particular resource shared among multiple clients.

22. The system of claim 13, wherein said physical lock file is a separate disk file stored on the server computer, and wherein one physical lock file is created for each directory of the server computer which has resources being shared among multiple clients.

23. The system of claim 13, wherein each logical file comprises a number of uniform storage blocks allocated within said physical file as a multiple of a common disk unit.

24. The system of claim 13, wherein said physical file comprises a physical lock file and wherein said plurality of logical files comprise a plurality of logical lock files, each logical lock file storing information for accessing particular resources of a database, said physical lock file having a plurality of uniform storage areas each of which stores no more than one logical lock file.

* * * * *